United States Patent
Beale et al.

(10) Patent No.: US 11,632,806 B2
(45) Date of Patent: Apr. 18, 2023

(54) COMMUNICATIONS DEVICE, INFRASTRUCTURE EQUIPMENT AND METHODS

(71) Applicants: Sony Corporation, Tokyo (JP); Sony Mobile Communications, Inc., Tokyo (JP)

(72) Inventors: Martin Warwick Beale, Basingstoke (GB); Shin Horng Wong, Basingstoke (GB); Basuki Priyanto, Lund (SE)

(73) Assignees: SONY CORPORATION, Tokyo (JP); SONY MOBILE COMMUNICATIONS, INC, Tokyo (JP)

( * ) Notice: Subject to any disclaimer, the term of this patent is extended or adjusted under 35 U.S.C. 154(b) by 76 days.

(21) Appl. No.: 17/267,030

(22) PCT Filed: Aug. 8, 2019

(86) PCT No.: PCT/EP2019/071327
§ 371 (c)(1),
(2) Date: Feb. 9, 2021

(87) PCT Pub. No.: WO2020/030741
PCT Pub. Date: Feb. 13, 2020

(65) Prior Publication Data
US 2021/0243817 A1 Aug. 5, 2021

(30) Foreign Application Priority Data
Aug. 10, 2018 (EP) .................................... 18188600

(51) Int. Cl.
*H04W 74/08* (2009.01)
*H04W 56/00* (2009.01)
(Continued)

(52) U.S. Cl.
CPC ...... *H04W 74/0833* (2013.01); *H04W 52/242* (2013.01); *H04W 56/004* (2013.01); *H04W 74/002* (2013.01)

(58) Field of Classification Search
None
See application file for complete search history.

(56) References Cited

U.S. PATENT DOCUMENTS

| 11,317,373 B2* | 4/2022 | Shih ................ H04W 72/1268 |
| 2008/0046719 A1* | 2/2008 | Kim ..................... H04L 63/205 |
| | | 713/156 |

(Continued)

FOREIGN PATENT DOCUMENTS

| WO | 2004/071051 A2 | 8/2004 |
| WO | 2011/035203 A2 | 3/2011 |
| WO | 2013/156937 A2 | 10/2013 |

OTHER PUBLICATIONS

International Search Report and Written Opinion dated Oct. 17, 2019, received for PCT Application PCT/EP2019/071327, Filed on Aug. 8, 2019, 15 pages.

(Continued)

*Primary Examiner* — Faiyazkhan Ghafoerkhan
(74) *Attorney, Agent, or Firm* — Xsensus LLP

(57) ABSTRACT

A communications device transmits data in preconfigured resources of an uplink of a wireless communications network by performing a procedure to determine whether the communications device can transmit signals in the preconfigured resources of the uplink, and if the communications device determines that it can transmit signals in the preconfigured resources, transmitting signals representing the data in the preconfigured resources. The procedure to determine whether the communications device can transmit signals in the preconfigured resources of the uplink includes a transmission parameter confirmation procedure which confirms (Continued)

that a value of one or more transmission parameters to be used for transmitting the signals representing the data can be used for the signals representing the data to be detected by an infrastructure equipment of the wireless communications network.

18 Claims, 13 Drawing Sheets

(51) Int. Cl.
*H04W 52/24* (2009.01)
*H04W 74/00* (2009.01)

(56) References Cited

U.S. PATENT DOCUMENTS

| | | | | |
|---|---|---|---|---|
| 2015/0189574 | A1* | 7/2015 | Ng | H04W 24/08 370/254 |
| 2018/0176847 | A1* | 6/2018 | Fasil Abdul | H04W 16/10 |
| 2019/0159265 | A1* | 5/2019 | Takeda | H04W 74/0833 |
| 2019/0254082 | A1* | 8/2019 | Takeda | H04L 1/1819 |
| 2019/0268946 | A1* | 8/2019 | Harada | H04W 74/02 |
| 2019/0306888 | A1* | 10/2019 | Takeda | H04W 74/08 |
| 2019/0342813 | A1* | 11/2019 | Fasil Abdul | H04W 16/10 |
| 2019/0350001 | A1* | 11/2019 | Takeda | H04B 7/088 |
| 2020/0288508 | A1* | 9/2020 | Shi | H04W 74/0833 |
| 2020/0383085 | A1* | 12/2020 | Shih | H04W 74/0833 |
| 2021/0227575 | A1* | 7/2021 | Ou | H04W 76/11 |
| 2021/0243817 | A1* | 8/2021 | Beale | H04W 56/004 |

OTHER PUBLICATIONS

3GPP, "NR; NR and NG-RAN Overall Description", Stage 2, Release 15, TS 38.300 V15.2.0, Jun. 2018, pp. 1-87.
Holma et al., "LTE for UMTS OFDMA and SC-FDMA Based Radio Access", John Wiley and Sons, 2009, pp. 25-27.
3GPP, "Study on Scenarios and Requirements for Next Generation Access Technologies", Release 14, TR 38.913 V14.2.0, Mar. 2017, pp. 1-38.
ETSI, "Evolved Universal Terrestrial Radio Access (E-UTRA); Medium Access Control (MAC) Protocol Specification", 3GPP TS 36.321 version 15.2.0 Release 15, Jul. 2018, pp. 1-127.
3GPP, "Evolved Universal Terrestrial Radio Access (E-UTRA); Multiplexing and Channel Coding", Release 15, TS 36.212 V15.2.0, Jun. 2018, pp. 1-245.
Ericsson et al., "New WID on Even further enhanced MTC for LTE", 3GPP TSG RAN Meeting #75, RP-170732, Mar. 6-9, 2017, 4 pages.
Huawei et al., "New WID on Further NB-IoT Enhancements", 3GPP TSG RAN Meeting #75, RP-170852, Mar. 6-9, 2017, 6 pages.
Ericsson, "New WID on Rel-16 MTC Enhancements for LTE", 3GPP TSG RAN Meeting #80, RP-181450, Jun. 11-14, 2018, 4 pages.
Ericsson et al., "New WID on Rel-16 Enhancements for NB-IoT", 3GPP TSG RAN Meeting #80, RP-181451, Jun. 11-14, 2018, 4 pages.

* cited by examiner

Time windows occupying different frequency resources and overlapping in time

UEs sending unique correctly timing advanced preambles to the eNodeB

COMMUNICATIONS DEVICE, INFRASTRUCTURE EQUIPMENT AND METHODS

CROSS-REFERENCE TO RELATED APPLICATIONS

The present application is based on PCT filing PCT/EP2019/071327, filed Aug. 8, 2019, which claims priority to EP 18188600.3, filed Aug. 10, 2018, the entire contents of each are incorporated herein by reference.

BACKGROUND

Field

The present disclosure relates to communications devices, infrastructure equipment and methods for transmitting data in preconfigured resources of a wireless access interface provided by a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to support efficiently communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of these expectations it is desirable for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

The increasing use of different types of communications devices associated with different traffic profiles gives rise to new challenges for efficiently handling communications in wireless telecommunications systems that need to be addressed. In particular it is desirable to communicate small amounts of data infrequently as efficiently as possible.

SUMMARY

The present disclosure can help address or mitigate at least some of the issues discussed above.

Embodiments of the present technique can provide a method of transmitting data by a communications devices in a wireless communications network, the method comprising performing a procedure to determine whether the communications device can transmit signals in the preconfigured resources of the uplink, and if the communications device determines that it can transmit signals in the preconfigured resources, transmitting signals representing the data in the preconfigured resources. The procedure to determine whether the communications device can transmit signals in the preconfigured resources of the uplink includes a transmission parameter confirmation procedure which confirms that a value of one or more transmission parameters to be used for transmitting the signals representing the data can be used for the signals representing the data to be detected by an infrastructure equipment of the wireless communications network.

Embodiments of the present technique can provide an arrangement in which a communications device can transmit data in preconfigured resources of an uplink of a wireless access interface without a requirement to receive an indication of one or more transmission parameters required for the transmitted signals to be detected. According to the present technique, the communications device performs a transmission parameter confirmation procedure in which, for example, it autonomously confirms an accuracy of the one or more transmission parameters. According to the transmission parameter confirmation procedure, the communications device can for example confirm that it can transmit in the preconfigured resources without adjusting the one or more transmission parameters, determine the one or more transmission parameters, confirm the accuracy of the one or more transmission parameters already acquired or perform a validation procedure of the transmission parameters before transmitting in the preconfigured resources. The one or more transmission parameters may include a timing advance to compensate for a propagation delay when transmitting signals to arrive at a particular time at the infrastructure equipment, or a transmission power of the signals transmitted in the preconfigured resources.

The preconfigured communications resources may be preconfigured in the sense that for example the communications resources are preconfigured for receiving signals representing data transmitted by one or more communications devices without being requested by the communications devices and without being granted by an infrastructure equipment of the wireless access interface.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
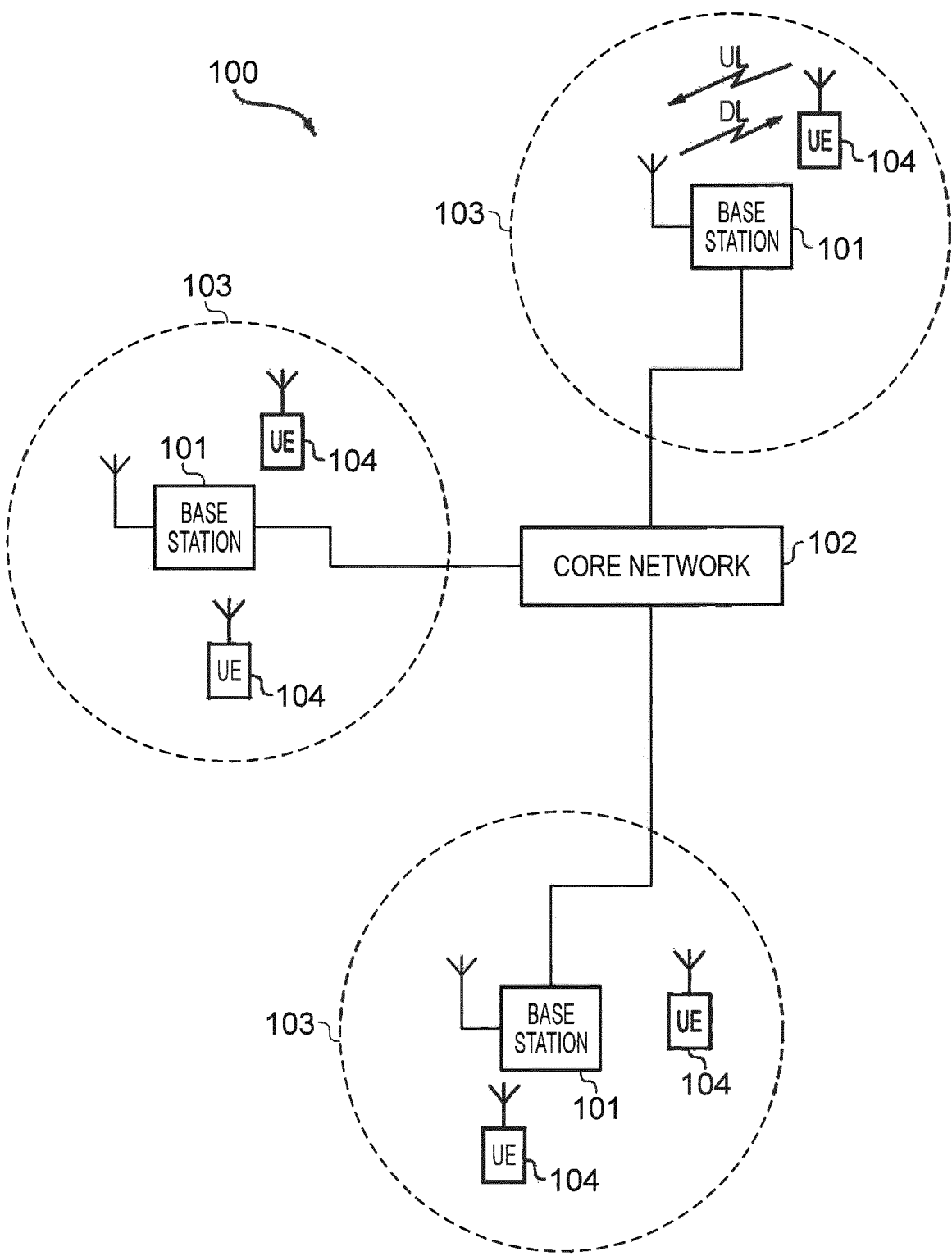
FIG. 1 schematically represents some aspects of an LTE-type wireless telecommunication system which may be configured to operate in accordance with example embodiments of the present disclosure.

Long Term Evolution Advanced Radio Access Technology (4G) FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink. Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, communications devices, and so forth. Base stations, which are an example of network infrastructure equipment/network access nodes, may also be referred to as transceiver stations/nodeBs/e-nodeBs, g-nodeBs and so forth. In this regard different terminology is often associated with different generations of wireless telecommunications systems for elements providing broadly comparable functionality. However, example embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

Figure 2:
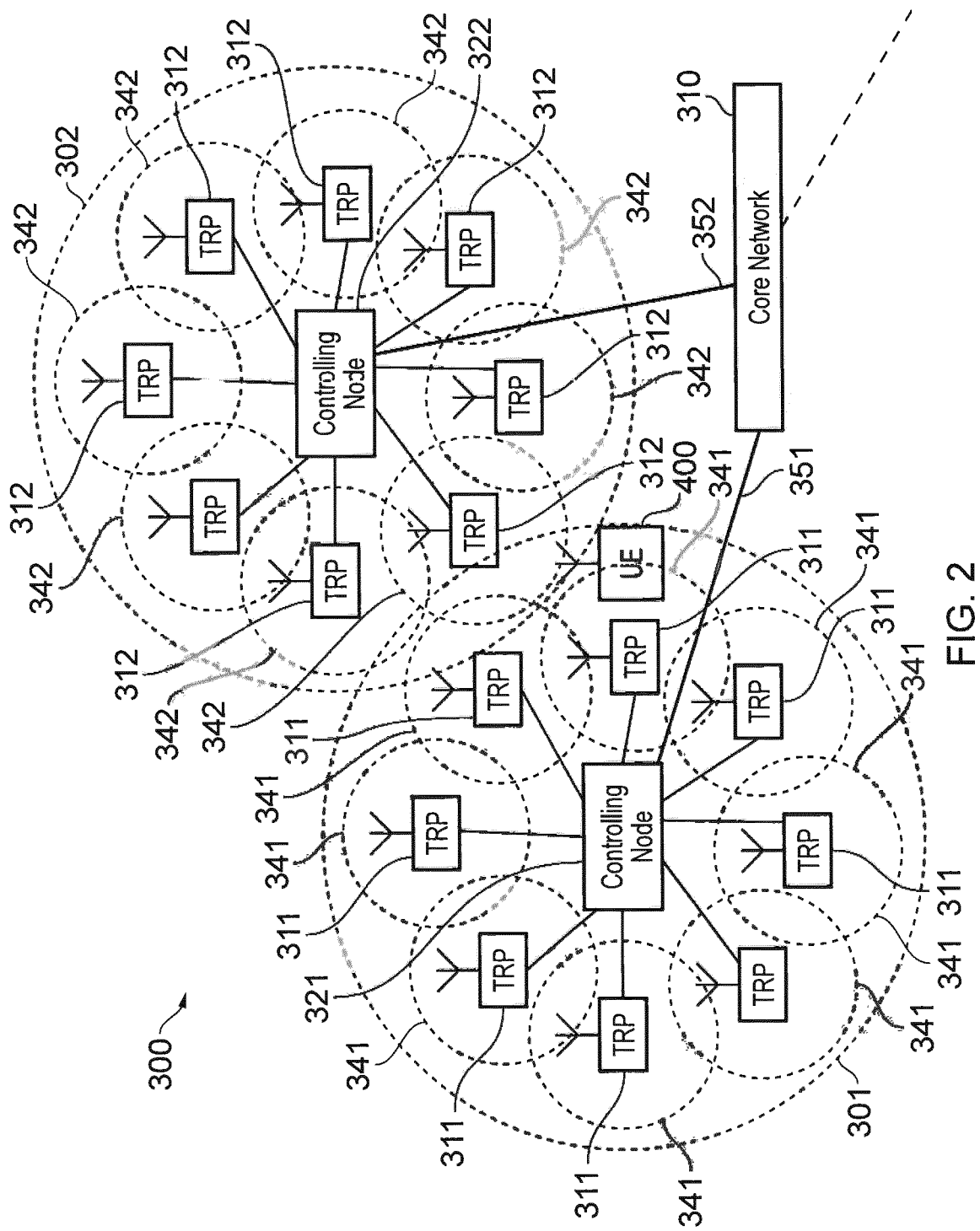
FIG. 2 schematically represents some example aspects of a new radio access technology (RAT) wireless communications network which may be configured to operate in accordance with embodiments of the present disclosure.

FIG. 2 is a schematic diagram illustrating a network architecture for a new RAT wireless communications network/system 300 based on previously proposed approaches which may also be adapted to provide functionality in accordance with embodiments of the disclosure described herein. The new RAT network 300 represented in FIG. 2 comprises a first communication cell 301 and a second communication cell 302. Each communication cell 301, 302, comprises a controlling node (centralised unit) 321, 322 in communication with a core network component 310 over a respective wired or wireless link 351, 352. The respective controlling nodes 321, 322 are also each in communication with a plurality of distributed units (radio access nodes/remote transmission and reception points (TRPs)) 311, 312 in their respective cells. Again, these communications may be over respective wired or wireless links. The distributed units 311, 312 are responsible for providing the radio access interface for communications devices connected to the network. Each distributed unit 311, 312 has a coverage area (radio access footprint) 341, 342 where the sum of the coverage areas of the distributed units under the control of a controlling node together define the coverage of the respective communication cells 301, 302. Each distributed unit 311, 312 includes transceiver circuitry for transmission and reception of wireless signals and processor circuitry configured to control the respective distributed units 311, 312.

In terms of broad top-level functionality, the core network component 310 of the new RAT communications network represented in FIG. 2 may be broadly considered to correspond with the core network 102 represented in FIG. 1, and the respective controlling nodes 321, 322 and their associated distributed units/TRPs 311, 312 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device 400 is represented in FIG. 2 within the coverage area of the first communication cell 301. This communications device 400 may thus exchange signalling with the first controlling node 321 in the first communication cell via one of the distributed units 311 associated with the first communication cell 301. In some cases communications for a given communications device are routed through only one of the distributed units, but it will be appreciated in some other implementations communications associated with a given communications device may be routed through more than one distributed unit, for example in a soft handover scenario and other scenarios.

The particular distributed unit(s) through which a communications device is currently connected through to the associated controlling node may be referred to as active distributed units for the communications device. Thus the active subset of distributed units for a communications device may comprise one or more than one distributed unit (TRP). The controlling node 321 is responsible for determining which of the distributed units 311 spanning the first communication cell 301 is responsible for radio communications with the communications device 400 at any given time (i.e. which of the distributed units are currently active distributed units for the communications device). Typically this will be based on measurements of radio channel conditions between the communications device 400 and respective ones of the distributed units 311. In this regard, it will be appreciated that the subset of the distributed units in a cell which are currently active for a communications device will depend, at least in part, on the location of the communications device within the cell (since this contributes significantly to the radio channel conditions that exist between the communications device and respective ones of the distributed units).

In at least some implementations the involvement of the distributed units in routing communications from the communications device to a controlling node (controlling unit) is transparent to the communications device 400. That is to say, in some cases the communications device may not be aware of which distributed unit is responsible for routing communications between the communications device 400 and the controlling node 321 of the communication cell 301 in which the communications device is currently operating, or even if any distributed units 311 are connected to the controlling node 321 and involved in the routing of communications at all. In such cases, as far as the communications device is concerned, it simply transmits uplink data to the controlling node 321 and receives downlink data from the controlling node 321 and the communications device has no awareness of the involvement of the distributed units 311, though may be aware of radio configurations transmitted by distributed units 311. However, in other embodiments, a communications device may be aware of which distributed unit(s) are involved in its communications. Switching and scheduling of the one or more distributed units may be done at the network controlling node based on measurements by the distributed units of the communications device uplink signal or measurements taken by the communications device and reported to the controlling node via one or more distributed units.

In the example of FIG. 2, two communication cells 301, 302 and one communications device 400 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 321, 322 and/or a TRP 311, 312 of the kind shown in FIG. 2 which is adapted to provide functionality in accordance with the principles described herein.

Figure 14:
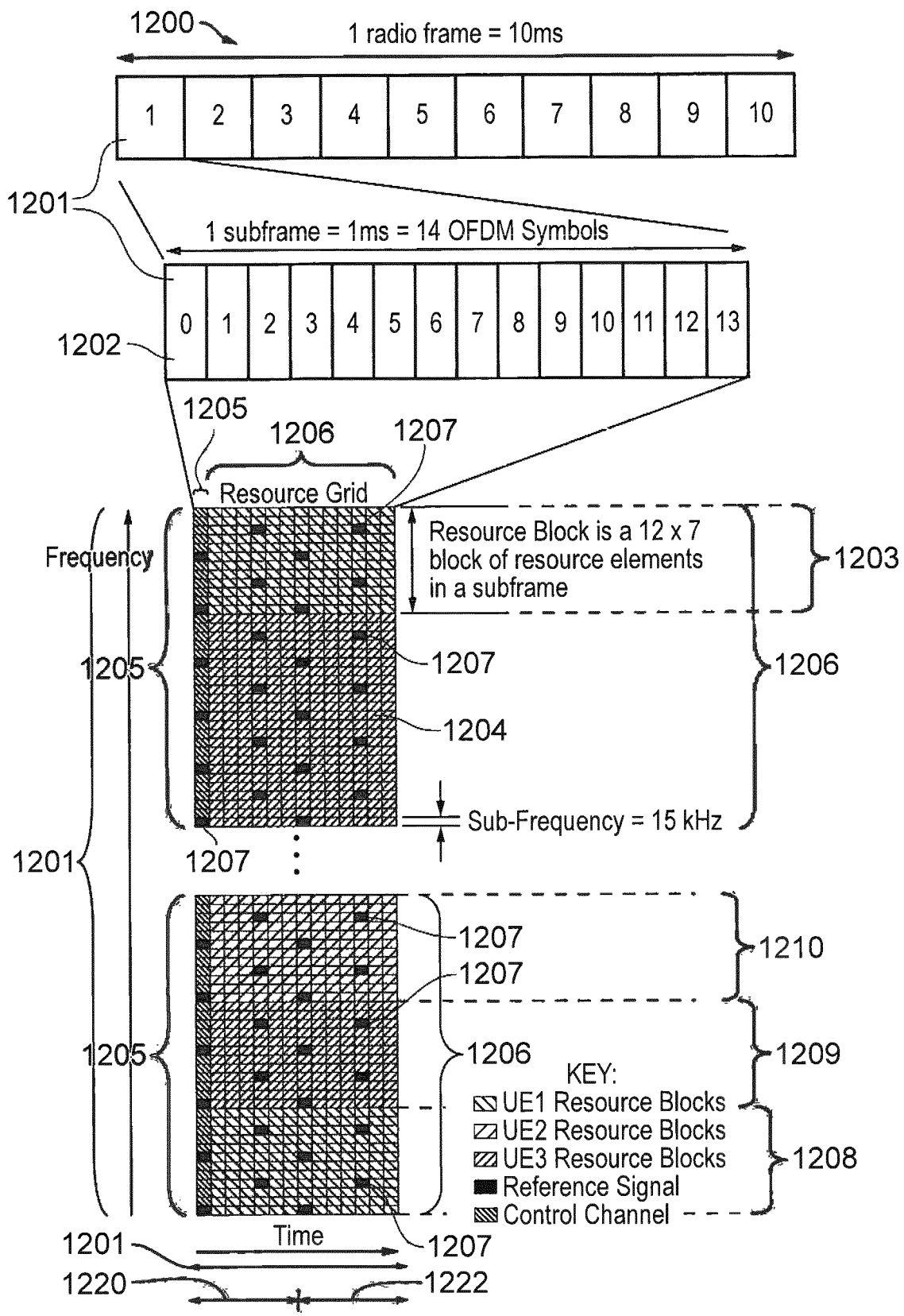
FIG. 14 is a schematic representation of a downlink of a wireless access interface according to the 3GPP LTE standard.
Figure 15:
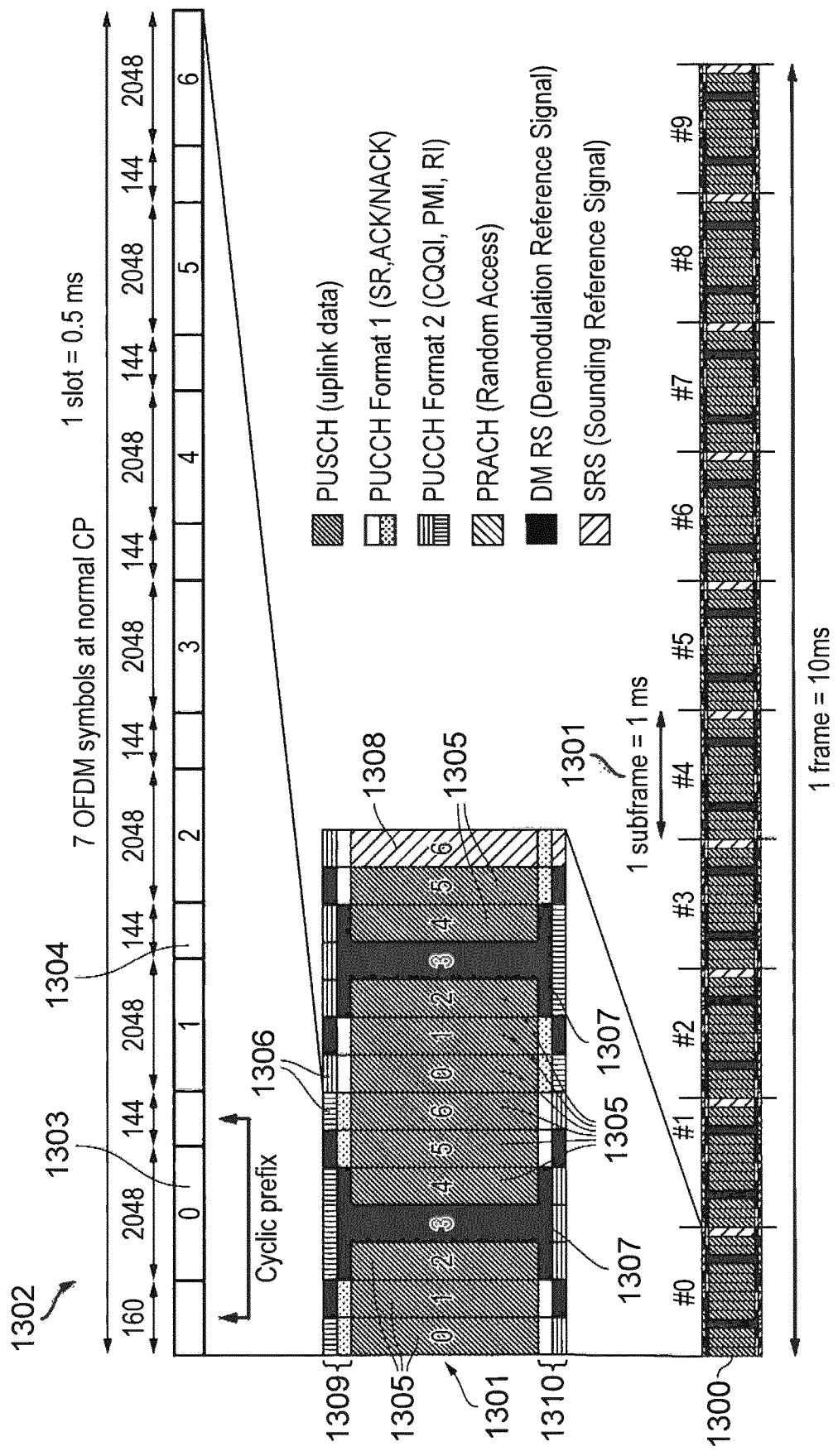
FIG. 15 is a schematic representation of an uplink of a wireless access interface according to the 3GPP LTE standard.

A wireless access interface in accordance with a 3GPP Standard for LTE is described in detail in Annex 1 in which FIGS. 14 and 15 provide detailed representation of a wireless access interface for the downlink and the uplink respectively. More details of the LTE wireless access interface are therefore described in Annex 1. However it will be appreciated that the wireless access interface provides physical communications resources including shared channels for both uplink and the downlink which may be accessed by communicating appropriate control signalling as those acquainted with LTE will appreciate. Equally a wireless access interface for the 5G Standard as represented in FIG. 2 may be similarly formed in accordance with the arrangement shown in Annex 1 and may use OFDM on the downlink and SC-FDMA on the uplink. However for clarity example embodiments will be described in the following paragraphs with reference to a simplified representation of a wireless access interface according for example to the 3GPP LTE standard as shown in FIG. 3.

Figure 3:
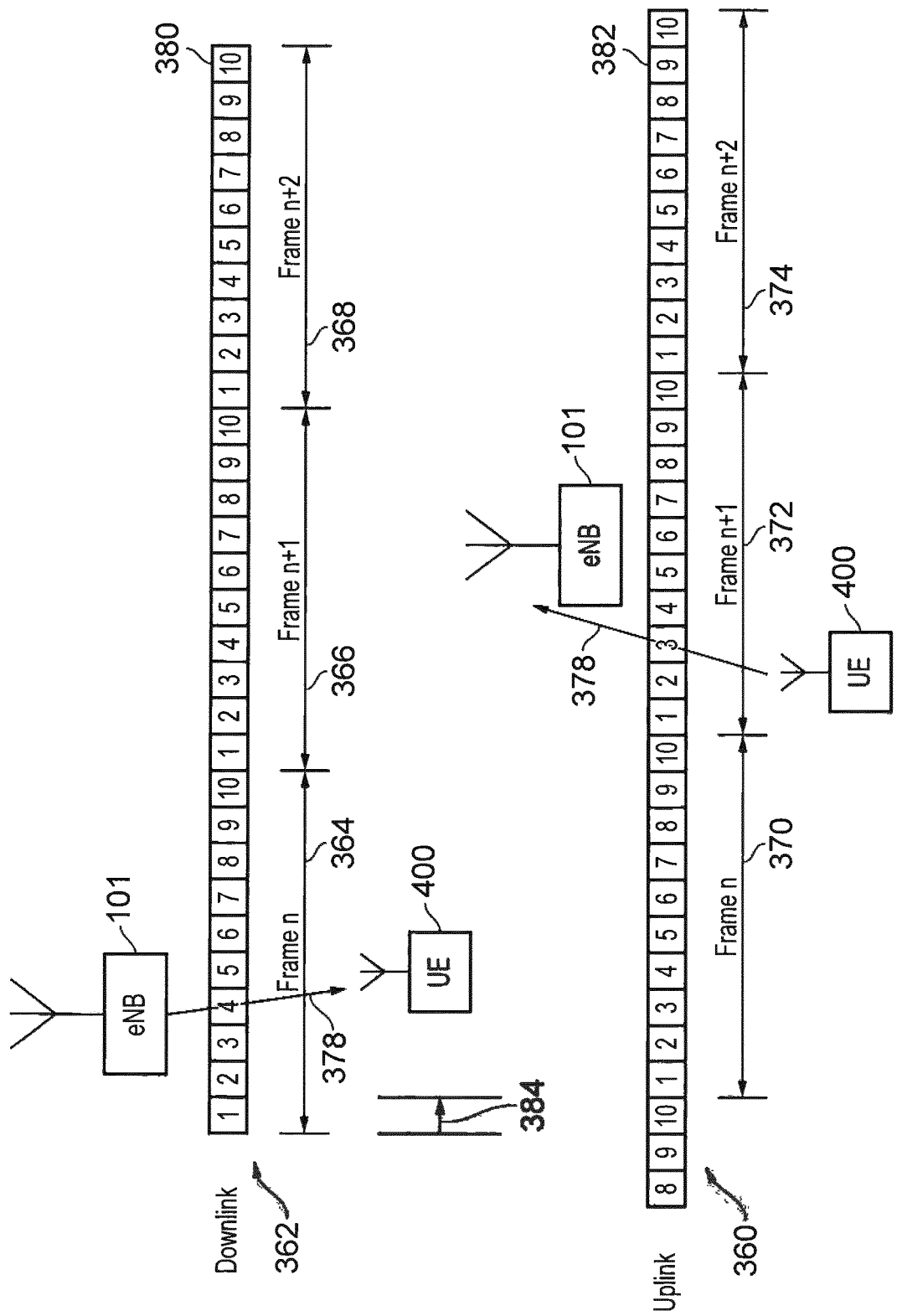
FIG. 3 is a simplified representation of a wireless access interface broadly corresponding to an LTE standard.

FIG. 3 provides a schematic representation of an uplink 360 and a downlink 362 of an LTE wireless access interface such as the example described in Annex 1. The uplink 360 and the downlink 362 are illustrated with three example frames 364, 366, 368 for the downlink and the three example frames of the uplink 370, 372, 374 which are numbered frame n, n+1, n+2. As will be appreciated, on the downlink the eNB 101 transmits to the UE 400 whereas on the uplink the UE 400 transmits to the eNB 101 as represented by arrows 376, 378 respectively.

As shown in FIG. 3, each of the uplink and the downlink 360, 362 frames comprises 10 subframes labelled 1 to 10 within boxes 380, 382 for the downlink and the uplink respectively which represent a subframe structure corresponding to that illustrated in FIGS. 14 and 15 of Annex 1. As will be appreciated by the arrows 378, 376 the respective eNB or UE are transmitting on shared channel resources in respect of the subframes for the wireless access interface.

In some examples the downlink and the uplink frame structure may be synchronised in respect of the time divided nature of the frame structure so that the frames and subframes of the uplink and downlink 380, 382 with the same number coincide with one another. However in other examples the downlink and uplink may be offset entirely with respect to each other as illustrated by an arrow 384.

In wireless telecommunications networks, such as LTE type or 5G type networks, there are different Radio Resource Control (RRC) modes for UEs. For example, it is common to support an RRC idle mode (RRC_IDLE) and an RRC connected mode (RRC_CONNECTED). A UE in the idle mode may transition to the RRC connected mode, for example because it needs to transmit uplink data or respond to a paging request, by undertaking a random access procedure. The random access procedure involves the UE transmitting a preamble on a physical random access channel and so the procedure is commonly referred to as a RACH or PRACH procedure/process.

Thus a conventional way for a UE in the RRC idle mode to exchange data with a network involves the UE first performing an RRC connection procedure (random access procedure) with the network.

After establishing an RRC connection and exchanging the relevant data, the UE may then perform RRC disconnection and move back into idle mode for power saving.

Permission to Use Grant-Free Communications Resources for A-MTC

Research into efficient communication of low cost autonomous communications devices, which are referred to as Machine-Type-Communications (MTC) devices or Internet of Things (IoT), has now proceeded to look into techniques for transmitting data in pre-configured communications resources. For example, 3GPP has completed two Release-15 Work Items on the Internet of Things (IoT) namely, efeMTC (Even Further Enhanced Machine Type Communications) [1] and feNB-IoT (Further Enhanced Narrowband Internet of Things) [7]. The IoT is further enhanced in 3GPP by introducing two additional Release-16 work items referred to herein as A-MTC (Additional Machine Type Communications Enhancements) [8] and A-NB-IoT (Additional Enhancement for Narrowband Internet of Things) [9]. As mentioned above, one of the objectives of Release-16 for A-MTC is to specify support for transmitting signals in preconfigured resources in idle and/or connected mode based on an SC-FDMA waveform for UEs with a valid timing advance, with both shared resources and dedicated resources being considered. As those acquainted with LTE will appreciate, SC-FDMA is an example of a multiple access technique which is used to form a wireless access interface for up-link transmissions of UEs to a 3GPP LTE configured wireless communications network.

The concept of preconfigured resources, referred to above, is to provide communications resources of the wireless access interface in which a UE can transmit without receiving a grant just prior to transmitting on those resources. The pre-configured communications resources can form part of physical uplink shared channel resources (PUSCH). In conventional arrangements such as 3GPP Release-15, in order to use the PUSCH resources, the UE needs to be granted the use of those resources. The procedure for granting those resources can take one of several forms, the most likely of which are:

The UE sends a PRACH preamble to the eNB

The eNB calculates timing offset and estimates the power level of the received preamble and sends a Random Access Response (RAR) to the UE which contains a timing advance (TA) command and an uplink grant. The uplink grant indicates the PUSCH resource and the power adjustment that the UE can use. The TA command signals the timing advance to apply to the PUSCH.

As those familiar with 3GPP standards will appreciate there are also more complicated procedures than the ones described above. When the UE does not currently have an RRC connection, the UE undertakes a PRACH procedure. A conventional PRACH procedure is presented in FIG. 4.

Figure 4:
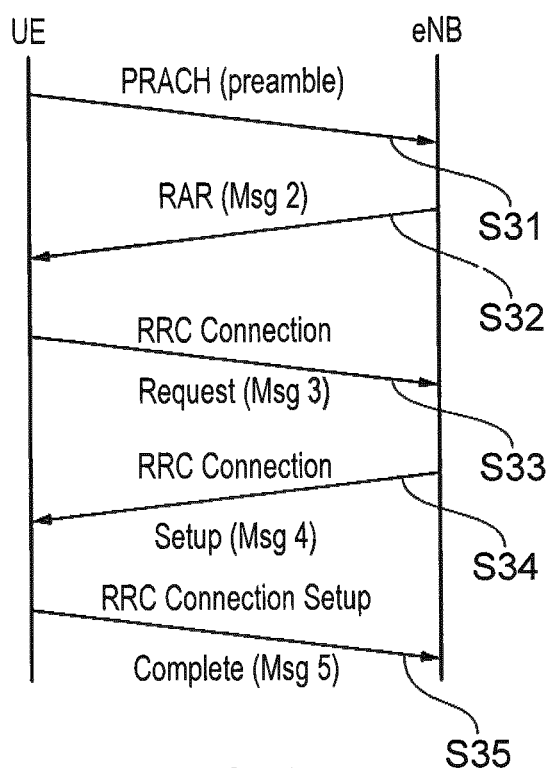
FIG. 4 is a representation of a message flow diagram illustrating a conventional random access procedure in which a communications device acquires one or more transmission parameters such as timing advance.

FIG. 4 is a ladder diagram that schematically shows message exchange between a UE and an eNodeB in a typical random access procedure to establish an RRC connection, in this example in an LTE-based network. The UE starts the process in step S31 by transmitting a random access request on a physical random access channel (PRACH in an LTE context), i.e. a random access preamble (RACH preamble), to the eNodeB. In step S32, when the eNodeB detects this preamble it will respond with a Random Access Response message (RAR), which is also known as Message 2. The RAR is scheduled by downlink control information (DCI) carried on a physical downlink control channel, e.g. MPDCCH in an LTE implementation for machine type communication (MTC) traffic, in a predefined Common Search Space (CSS). The RAR itself is transmitted on a physical downlink shared channel (PDSCH) resource allocated via the DCI. The DCI is addressed to an RA-RNTI (random access radio network temporary identifier) which is derived from the time and frequency resources used to transmit the preamble in step S31, and the RAR will indicate which preamble the eNodeB has detected and is responding to. It may be noted that it is possible that multiple UEs may transmit a random access request using the same PRACH preamble and in the same time and frequency resources. The RAR of step S32 also contains an uplink grant for the preamble the network is responding to so that the UE that transmitted the preamble may use this uplink grant to transmit an RRC Connection Request message, also known as Message 3 to the eNodeB, in step S33. Message 3 also contains an indication of an identifier, ID, for the UE (e.g. a C-RNTI (cell radio network temporary identifier) or S-TMSI (system architecture evolution (SAE) temporary mobile subscriber identity) or a 40-bit random number generated by the UE). The eNodeB will respond to Message 3, in step S34, with Message 4 which carries an RRC Connection Setup message. For the case where multiple UEs use the same preamble, Message 4 provides contention resolution functionality, for example using a communications device identifier, such as C-RNTI or S-TMSI, transmitted in Message 3 (when a UE receives a Message 4 that contains a portion of the Message 3 containing the UE ID that it transmitted earlier, it knows that there was no contention on the Message 3 that it had transmitted). The RRC connection is complete when the UE transmits Message 5 in step S35 containing an RRC Connection Setup Complete message.

As illustrated by the message flow diagram in FIG. 4, the RAR sent by the eNB in step S32 in response to the PRACH sent in step S31 allocates some timing advanced and power controlled PUSCH resource for the UE to send a Message 3, where the Message 3 can either allow the UE to form an RRC connection with the network or can allow the UE to send uplink data directly using Early Data Transmission (EDT).

In Release-15 and prior to Release-15, it is known that the UE can use preconfigured resources. The UE can use these pre-configured resources without having to receive an explicit grant from the UE to use any one instance of those grant free resources. Examples of the UE using pre-configured resources include:

Semi-persistent scheduling in LTE. A UE is allocated (via RRC signalling) some PUSCH resources that it can use for a defined period of time (i.e. the PUSCH resources are semi-statically assigned to the UE). An example SPS allocation would be that the UE can use some assigned PRBs (physical resource blocks) for PUSCH in every N'th subframe (e.g. N=16).

uplink grant free resources in NR. This is similar to SPS in LTE. The UE can use semi-statically assigned PUSCH resources. Release-15 supports the UE using orthogonal resources for PUSCH (one implication being that the PUSCH transmission from the UE is timing advanced).

There are ongoing discussions about the UE being able to use non-orthogonal resources (NOMA) for the uplink transmissions in NR, where the PUSCH resources would use a waveform that does not require correct timing between the UE and eNB.

In the above example, timing advance is provided to the UE according to a conventional arrangement. For the example of SPS, when there is a timing offset between the UE and eNB, the eNB sends a timing advance command to the UE such that the next time the UE sends PUSCH to the eNB, that next PUSCH is correctly timing advanced.

Note that in the above examples of pre-configured resources, the eNB determines whether to assign SPS (or uplink grant free) resources to UEs such that different UEs have unique and non-overlapping resources, or whether to assign overlapping resources. When there are overlapping resources, the eNB needs to handle the case where there are collisions in uplink transmissions (where two UEs choose to use the same overlapping resource at the same time).

A UE may transmit infrequently to the eNB (for example, it may send a meter reading report every 24 hours to the eNB). In such cases the timing advance value of the UE may be incorrect between reports (for example when the UE has moved location). The procedure to correct the timing advance between the UE and eNB is fairly onerous, involving executing a PRACH procedure.

Timing advance is one example of a transmission parameter with which signals transmitted by a UE should be adjusted in order for the signals can be received at the eNB when the eNB is configured to detect those signals successfully to communicate data. Timing advance needs to be corrected if there is a mismatch between the timing of the UE and that of the eNB, which is typically caused by a propagation delay of the signals in transit. This timing mismatch can occur either in IDLE mode or CONNECTED mode. In CONNECTED mode, a timing mismatch can occur when the DRX cycle is long (such that the UE infrequently transmits PUSCH and infrequently receives timing advance commands). In IDLE mode, the time between timing advance commands can be long, leading to a timing mismatch between the UE and eNB. Embodiments of the present technique are applicable to both IDLE mode and CONNECTED mode.

Embodiments of the present technique can provide an arrangement in which a UE performs a transmission parameter confirmation procedure before transmitting signals in pre-configured communications resources of the uplink of a wireless access interface. As a result a UE can use those preconfigured resources, with correct transmission parameters such as timing advance and/or power level, without having to receive an indication of those parameters from an eNB for example by executing a PRACH procedure. Accordingly, in some example embodiments a process in which a UE transmits data in preconfigured resource may comprise three phrases:

1. An eNB signals to a UE criteria which need to be met before the UE is allowed to use preconfigured resources.
2. The UE performs a procedure to determine whether one or more transmission parameters required to communicate data are correct, such as determining whether it has correct timing advance information (or other correct transmission parameter such as power level).
3. The eNB updates the one or more transmission parameters of the UE with new status information, such as for example its timing advance state.

The above phases may be carried out in different orders and not all of the steps need to be performed. However embodiments of the present technique may be characterised by UEs performing autonomously an assessment of whether they are permitted to transmit in the preconfigured resources with one or more transmission parameters according to phase 2 above.

Figure 5:
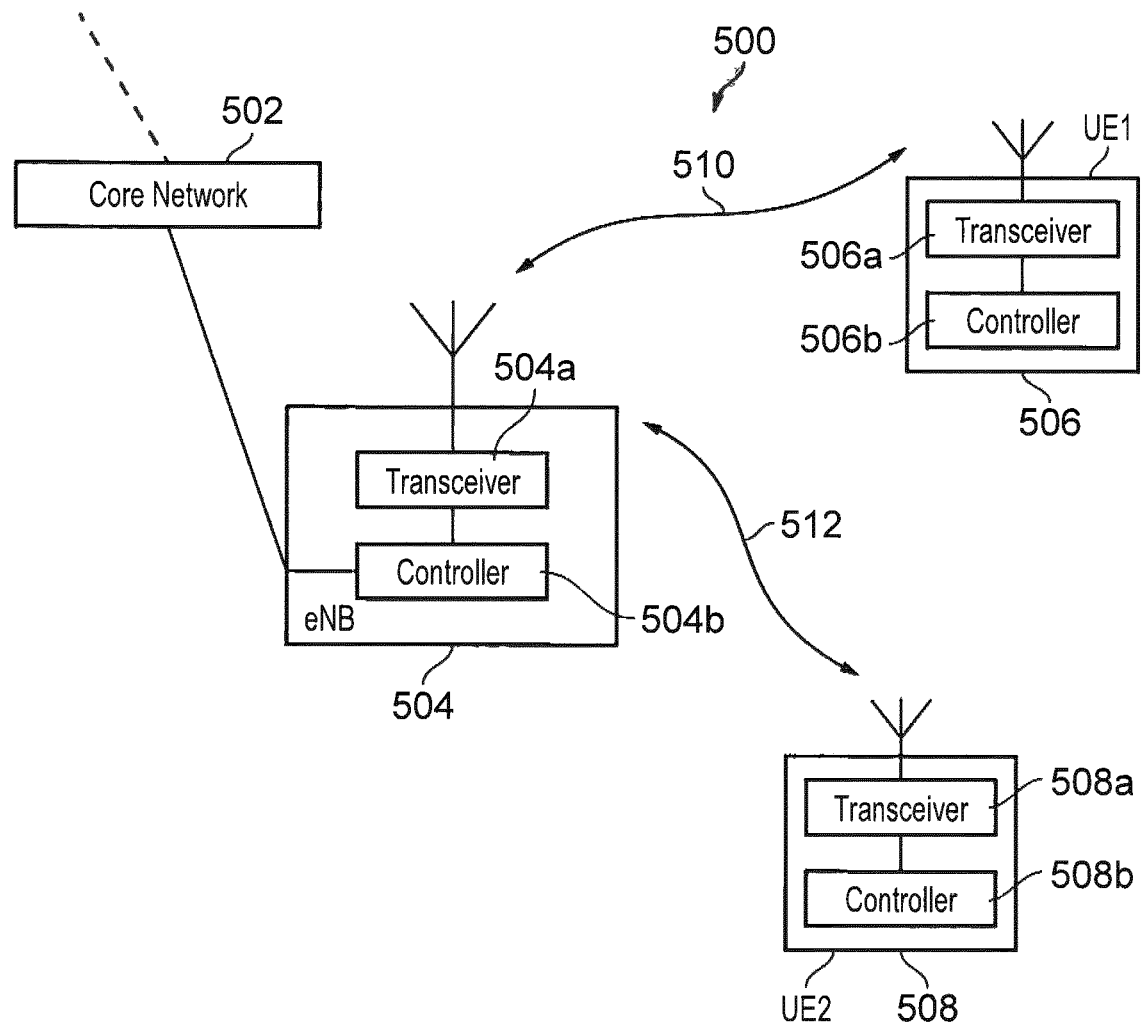
FIG. 5 schematically shows a telecommunications system according to an embodiment of the present disclosure.

FIG. 5 schematically shows a telecommunications system 500 according to an example embodiment of the present disclosure. The telecommunications system 500 in this example is based broadly around an LTE-type architecture. As such many aspects of the operation of the telecommunications system/network 500 are known and understood and are not described here in detail in the interest of brevity. Operational aspects of the telecommunications system 500 which are not specifically described herein may be implemented in accordance with any known techniques, for example according to the current LTE-standards.

The telecommunications system 500 comprises a core network part (evolved packet core) 502 coupled to a radio network part. The radio network part comprises a base station (evolved-nodeB) 504 coupled to a plurality of communications devices. In this example, two communications devices are shown, namely a first communications device 506 and a second communications device 508. It will of course be appreciated that in practice the radio network part may comprise a plurality of base stations serving a larger number of communications devices across various communication cells. However, only a single base station and two communications devices are shown in FIG. 5 in the interests of simplicity.

As with a conventional mobile radio network, the communications devices 506, 508 are arranged to communicate data to and from the base station (transceiver station) 504. The base station is in turn communicatively connected to a serving gateway, S-GW, (not shown) in the core network part which is arranged to perform routing and management of mobile communications services to the communications devices in the telecommunications system 500 via the base station 504. In order to maintain mobility management and connectivity, the core network part 502 also includes a mobility management entity (not shown) which manages the enhanced packet service (EPS) connections with the communications devices 506, 508 operating in the communications system based on subscriber information stored in a home subscriber server (HSS). Other network components in the core network (also not shown for simplicity) include a policy charging and resource function (PCRF) and a packet data network gateway (PDN-GW) which provides a connection from the core network part 502 to an external packet data network, for example the Internet. As noted above, the operation of the various elements of the communications system 500 shown in FIG. 5 may be broadly conventional apart from where modified to provide functionality in accordance with embodiments of the present disclosure as discussed herein.

The communications devices 506, 508 (which may correspond to the communications device 104) comprise transceiver circuitry 506a, 508a (which may also be referred to as a transceiver/transceiver unit) for transmission and reception of wireless signals and processor circuitry 506b, 508b (which may also be referred to as a processor/processor unit) configured to control the devices 506, 508. The processor circuitry 506b, 508b may comprise various sub-units/sub-circuits for providing functionality as explained further herein. These sub-units may be implemented as discrete hardware elements or as appropriately configured functions of the processor circuitry. Thus the processor circuitry 506b, 508b may comprise circuitry which is suitably configured/programmed to provide the desired functionality using conventional programming/configuration techniques for equipment in wireless telecommunications systems. The transceiver circuitry 506a, 508a and the processor circuitry 506b, 508b are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). As will be appreciated the communications devices 506, 508 will in general comprise various other elements associated with its operating functionality, for example a power source, user interface, and so forth, but these are not shown in FIG. 5 in the interests of simplicity.

The base station 504 (which may correspond to the infrastructure equipment 101) comprises transceiver circuitry 504a (which may also be referred to as a transceiver/transceiver unit) for transmission and reception of wireless signals and processor circuitry 504b (which may also be referred to as a processor/processor unit) configured to control the base station 504 to operate in accordance with embodiments of the present disclosure as described herein. The processor circuitry 504b may comprise various sub-units/sub-circuits for providing desired functionality as explained further herein. These sub-units may be implemented as discrete hardware elements or as appropriately configured functions of the processor circuitry. Thus the processor circuitry 504b may comprise circuitry which is suitably configured/programmed to provide the desired functionality described herein using conventional programming/configuration techniques for equipment in wireless telecommunications systems. The transceiver circuitry 504a and the processor circuitry 504b are schematically shown in FIG. 5 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the base station 504 will in general comprise various other elements associated with its operating functionality.

Thus, the base station 504 is configured to communicate data with the communications devices 506, 508 according to an embodiment of the disclosure over respective communication links 510, 512. The base station 504 is configured to communicate with the communications device 506 over the associated radio communication link 510 and with the communications device 508 over the associated radio communication link 512 generally following the established principles of LTE-based or 5G/NR communications, apart from using modified procedures in accordance with certain embodiments of the present disclosure as described herein.

Figure 6:
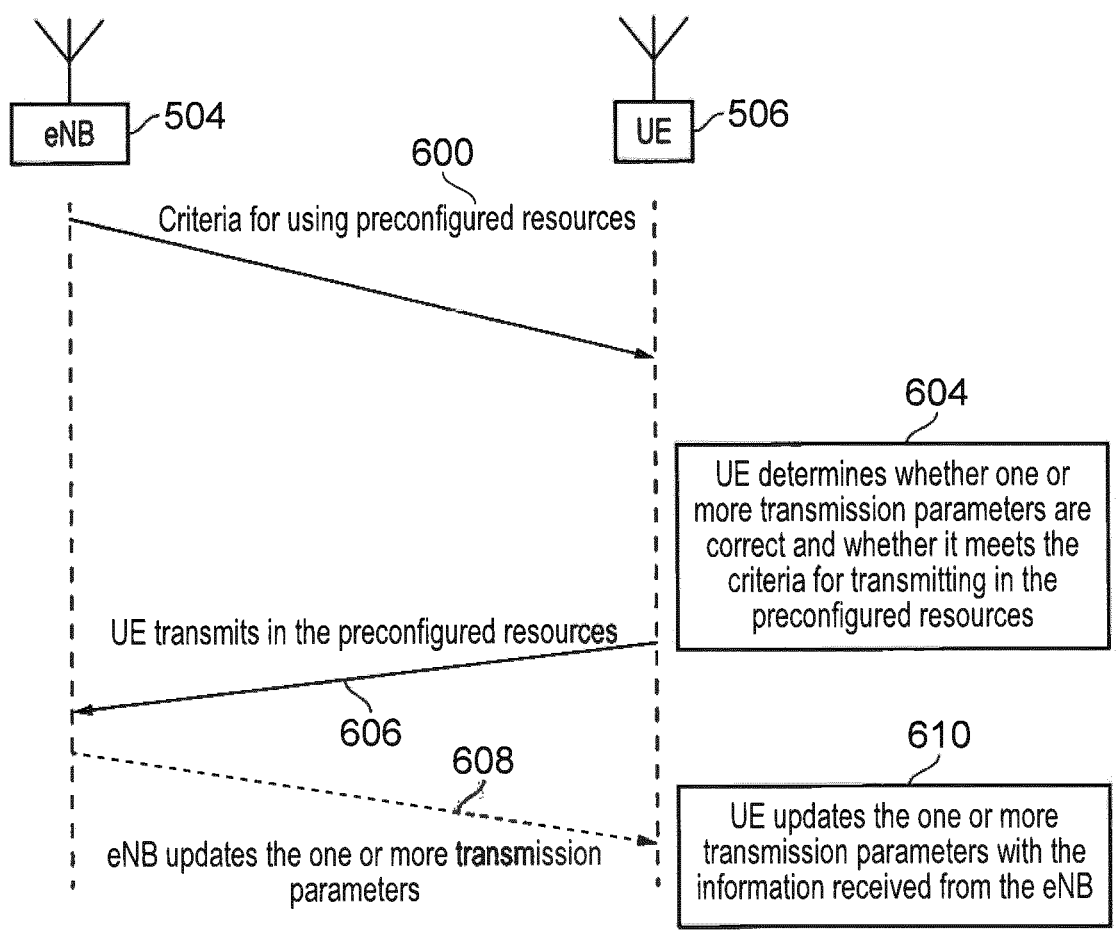
FIG. 6 is a part message exchange-part flow diagram illustrating a procedure in which a communications device transmits data in preconfigured resources according to an example embodiment of the present technique.

Example embodiments of the present technique are illustrated by a part message flow diagram, part process flow diagram illustrated in FIG. 6. FIG. 6 provides an example illustration of a confirmation process performed by a UE 400 before transmitting in preconfigured resources of a wireless access interface provided by an eNB 504. As will be explained in the following example embodiments, the eNB 504 first transmits data representing criteria for using the preconfigured resources of the wireless access interface for uplink transmission in a message or messages 600. This corresponds to the phase 1 mentioned above. This message or signalling provides information defining the criteria which specify the conditions under which a UE may transmit in the preconfigured resources of the uplink. This message or messages 600 transmitted by the eNB 504 indicates to the UEs 506, 508 how they can use preconfigured resources. This signalling message or messages also describes how the eNB 504 can signal to the UE 506, 508 that an aspect of the preconfigured resources has changed. A natural time to send this signalling message 600 would be the time at which the UE 506, 508 is configured with the preconfigured resources (e.g. at RRC connection setup). The preconfigured resources could alternatively be indicated using system information signalling.

According to some example embodiments the eNB 504 may transmit as part of the signalling message 600 one or more transmission parameters which should be used by the UE 506 when transmitting in the preconfigured resources or trigger a procedure which results in the UE 506, 508 acquiring those transmission parameters. Examples of the one or more transmission parameters include a timing advance to compensate for any propagation delay between the transmission of signals from the UE to the eNB and an indication of a transmission power with which the UE 506, 508 should transmit signals to arrive at the eNB 504 with a power within a range which is similar to the transmissions from other UEs.

Phase 1: Signalling of Criteria that Need to be Met Before UE is Allowed to Use Preconfigured Resources According to some example embodiments, in phase 1, the eNB 504 signals to the UE the circumstances in which it should send a PRACH preamble prior to sending data on preconfigured resources. The circumstances in which the UE should send a PRACH preamble may be signalled in the criteria for using the preconfigured resources by the eNB 405, for example by the message 600. Examples of these circumstances include:

- In one example, an eNB 504 signals that the UE 506, 508 must send a PRACH if it does not know whether it has correct timing advance
- In another example, the eNB 504 signals that the UE 506, 508 must send a PRACH if either it does not know whether it has correct timing or does not know whether its transmit power level is correct
- In another example, the eNB 504 signals that the UE 506, 508 may send a PRACH irrespective of whether the UE knows it has correct timing or not. For example, for a small cell, the radius of the cell may be so small that a UE transmission will arrive with adequate cyclic prefix alignment regardless of the location of the UE within the cell (as long as the UE transmits in the uplink in synchronism with downlink subframe boundaries, the uplink transmissions will arrive at the eNB within the cyclic prefix).

The eNB 504 hence can indicate whether a PRACH is required or the UE 506 can skip the PRACH process and use the preconfigured resources. In one example this signalling can be broadcast in the SIB, that is the eNB 504 can broadcast whether there is a need for UE 506 to send a PRACH preamble prior to transmitting on the preconfigured resources. In another example, each Coverage Enhancement Level (namely RACH CE levels 0, 1, 2, 3) has an independent signalling, that is the eNB 504 can decide to turn on the need for a PRACH for access of pre-configured resource on a per CE level basis.

In another example the eNB 504 can activate and deactivate the use of preconfigured resources by signalling their activation status in the SIBs. In another example each CE level has a separate activation/deactivation indicator.

Some UEs 506, 508 may know that they have correct timing (e.g. a UE that implements a GPS receiver). Since these UEs 506, 508 have correct timing, they might assume that they do not need to send a PRACH to the eNB for use of preconfigured resources. However, since there are eNB implementations that are concerned about receiving preconfigured resources at the correct power level, it is advantageous that the eNB can inform the UEs that even though they have correct timing advance, they also need to ensure that their transmit power level is correct.

According to the present technique the UE 506 then performs a process step 604 in which it determines whether the one or more transmission parameters are correct or still correct after for example a predetermined delay, for example as a result of a long DRX cycle. The process step 604 corresponds to phase 2 mentioned above and can be referred to generally as a "transmission parameter confirmation procedure". This procedure may include validating the value of one or more transmission parameters which may have been communicated from the eNB 504. The UE also determines whether it meets the criteria for transmitting in the preconfigured resources of the uplink of the wireless access interface provided by the eNB 504. If it does then the UE 504 transmits signals representing data in the preconfigured resources as represented by arrow 606.

Phase 2: UE Determination of Whether UE has Correct Timing Advance Information

According to some example embodiments, the process step 604, which corresponds to phase 2 mentioned above, can provide the UE 506, 508 with an indication of how it can determine whether its transmission parameters, like timing advance information, are correct. The UE 506, 508 can then perform a transmission parameter confirmation procedure in which it determines and/or confirms a current value of its transmission parameters by itself using additional information (side information). Alternatively or in addition, the UE 506, 508 may co-operate with an eNB 504 to request information from the eNB to acquire or validate the transmission parameters, for example by requesting a confirmation that its current timing advance information is still correct or confirming that its timing advance is correct by transmitting a preamble as explained in the examples below.

Figure 7:
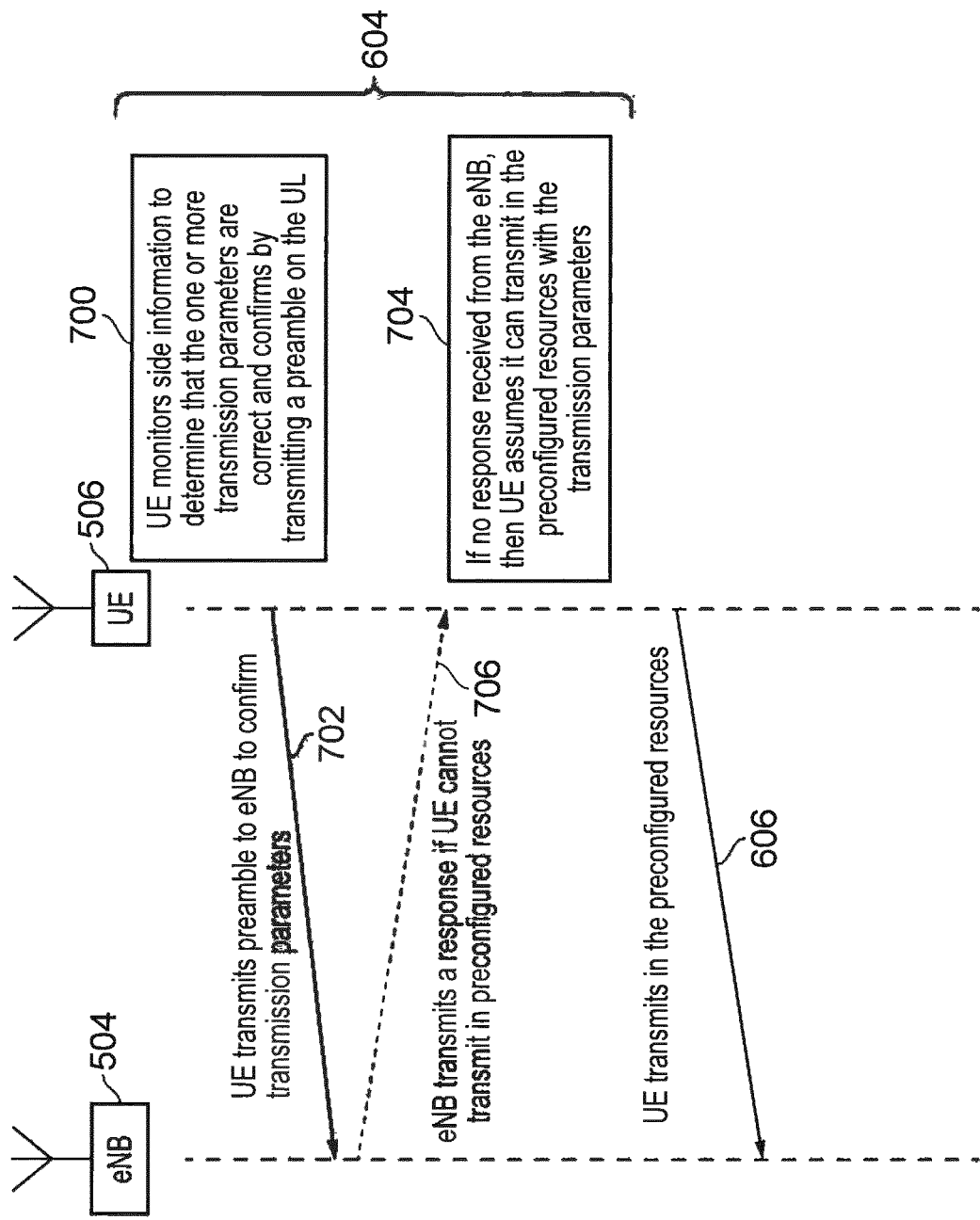
FIG. 7 is a part message exchange-part flow diagram illustrating a transmission parameter confirmation procedure in which a communications device confirms or acquires a value of one or more transmission parameters before transmitting data in preconfigured resources according to an example embodiment of the present technique.

A more specific illustration of co-operation with an eNB to validate the transmission parameters in process step 604 is shown in FIG. 7. FIG. 7 provides an example illustration of the process in which the UE determines whether the one or more transmission parameters which are to be used for transmitting in the preconfigured resources are correct. As shown in FIG. 7, once it has acquired an indication of the transmission parameters which should be used to transmit information via preconfigured resources of the uplink, in process step 700, the UE 506 monitors 'side' information in order to determine autonomously whether or not the UE has changed its position and therefore whether the accuracy of the one or more transmission parameters is correct without a further communication from the eNB 504. The UE can alternatively or additionally use the side information to maintain, estimate or update the value of the transmission parameters. Examples of side information include:

- GPS information. If the geographical co-ordinates of the UE have not changed, the UE can assume that its timing relative to that of the eNodeB is the same.
- Doppler measurements. If the UE determines that its Doppler is zero, it can assume that its timing relative to the cell has not changed.
- Observed Time Difference of Arrival (OTDOA) measurements. The UE monitors PRS (positioning reference signals) that may be transmitted by different eNodeBs. If the measured time differences between the eNodeBs do not change, it can be assumed that the UE is not moving relative to the eNodeBs and hence the timing relative to the serving eNodeB has not changed. In another example, if the serving eNodeB time of arrival (ToA) does not change, it can be assumed that the distance between the UE and the serving eNodeB has not changed.

RSRP measurements. The UE monitors the reference signal received power (RSRP). Provided the RSRP does not change, the UE can assume that the distance between the UE and eNodeB is not changed and hence the timing relative to the eNodeB has not changed.

Pre-configuration within the UE application or SIM card. E.g. UE is a utility meter. The UE application or SIM card states that the device is stationary and the UE's modem hence assumes that the timing advance does not change A timer is started when the UE obtains an update of the timing advance from the network (e.g. via the RAR) such that the timing advance becomes invalid when this timer expires. This timer can be configured by the network or specified in the specifications.

It will be appreciated that the UE can use a combination of any of the above side information in order to increase the accuracy of the determination of its timing advance validity (e.g. the UE can assume valid timing advance if both OTDOA measurements and RSRP measurements do not change).

It will be appreciated that there are inaccuracies applied to measurements, such as OTDOA and Doppler measurements. Hence the UE can be considered to have correct timing offset provided the above measurements are less than certain thresholds. The thresholds themselves can be a function of various parameters. For example a Doppler measurement threshold can be relative to the time between activity on PUSCH (or more precisely the time between the UE receiving its last timing advance command and the current time).

As shown in FIG. 7, the example of the process step 604 in which the UE maintains and confirms the accuracy of the transmission parameters according to a transmission parameter confirmation procedure can further or alternatively include transmitting a preamble to the eNB in a sub-frame which is used by the eNB 504 to confirm that the one or more transmission parameters are correct. This is because if the transmission parameters are correct then the eNodeB will receive the preamble in accordance with transmission parameters which are within predetermined tolerance thresholds, example transmission parameters being the timing advance and the transmission power. The transmission of the preamble by the UE 506 is represented by an arrow 702. In response, the eNB 504 determines whether the one or more transmission parameters are correct by detecting the transmitted preamble. If the transmission parameters are within predetermined thresholds according to a predetermined tolerance level(s) then the UE can proceed to transmit the data in the preconfigured resources as represented by step 704. However if the eNB 504 detects that the transmission parameters are not within predetermined tolerance levels then optionally the eNB 504 transmits a message as represented by a dotted arrow 706 indicating that the UE cannot transmit in the preconfigured resources. If the UE can transmit in the preconfigured resources then it transmits the data as represented by an arrow 606.

In an alternative example, generally based on FIG. 7, the UE firstly transmits a preamble, as represented by an arrow 702. In response, the eNB 504 determines whether the one or more transmission parameters are correct by detecting the transmitted preamble. If the transmission parameters are within predetermined thresholds according to a predetermined tolerance level(s) then eNB 504 transmits a signal to the UE indicating that the UE can proceed to use the preconfigured resources. However if the eNB 504 detects that the transmission parameters are not within predetermined tolerance levels, or does not detect the preamble, then optionally the eNB 504 does not transmit a signal to the UE. By not receiving this signal from the eNB, the UE determines that it cannot transmit in the preconfigured resources. If the UE receives the signal from the eNB indicating that it can transmit in the preconfigured resources then it transmits the data as represented by an arrow 606. In this example, by arranging for the eNB to transmit a confirmation that the preamble has been correctly received with the transmission parameters used, the procedure is more robust in case of a preamble failure. If the UE's timing advance is not correct, then the preamble may not be received by the eNB. In that case, the eNB does not know that the UE had sent a preamble and cannot send a NACK. Hence if the UE understands a "lack of signal from eNB" as an indication that the preconfigured resources cannot be used, then the procedure is more robust.

Figure 8:
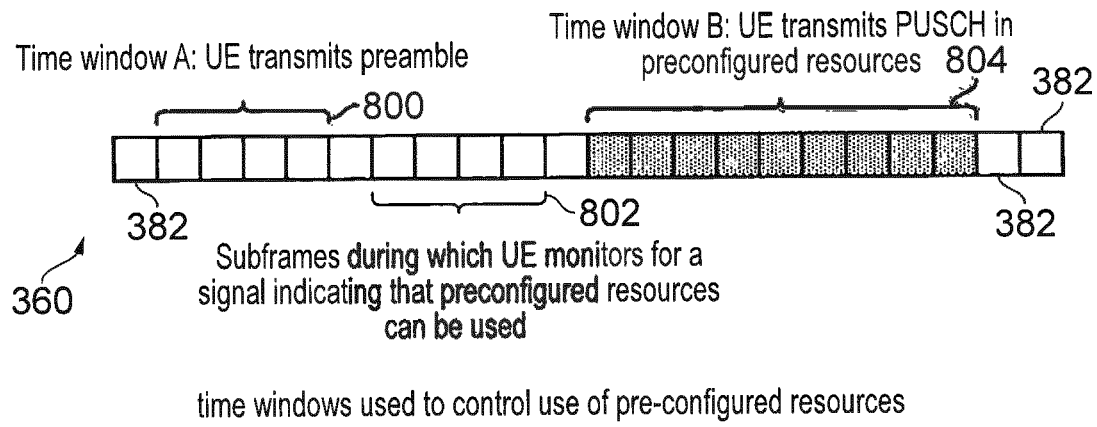
FIG. 8 is a schematic representation of uplink subframes of a wireless access interface illustrating transmission and reception by a communications device when performing the transmission parameter confirmation procedure according to an example embodiment of the present technique.

In accordance with the example embodiment illustrated by FIG. 7, FIG. 8 provides an example representation of an uplink of a wireless access interface shown in FIG. 3 in which the sub-frames are divided into different regions for effecting the process illustrated in FIG. 7. As shown in FIG. 8 in a first time window A 800 a UE transmits a preamble as represented by the arrow 702 in FIG. 7. The UE then waits for a number of sub-frames 802 to determine whether the eNB transmits a response indicating that the UE can use the preconfigured resources as represented by the arrow 706 in FIG. 7. If the eNB 504 does transmit an indication that the UE can use the preconfigured resources then in a further window B providing sub-frames indicated by a hashed shading 804 the UE can proceed to transmit in the PUSCH of the preconfigured resources. According to this example embodiment:

There are two time windows A and B 800, 804 defined:
A time window to indicate a desire to use preconfigured resources (time window A 800)
A time window during which the UE can use preconfigured resources (time window B 804)
Note that the time extent of the time window A 800 does not need to be the same as the extent of the time window B 804.

In time window A, the UE transmits a preamble (e.g. a PRACH preamble). The preamble is timing advanced with the timing (relative to the subframe boundary) that the UE intends to transmit the PUSCH in the preconfigured resources in time window B. It should be appreciated that in the current system the preamble is typically transmitted without timing advance since one of the purposes of the preamble is for the eNB to measure the required timing advance. In contrast according to this example embodiment the preamble is transmitted with an estimated timing advanced by an amount estimated by the UE, so that the eNB can determine whether the UE has a valid timing advance. The intended timing can be derived according to various means:

Based on the previous timing advance value that the UE was configured with

Based on the previous timing advance and compensated for by an algorithm in the UE (e.g. the UE measures the Doppler speed and calculates the difference in RSRP, thus allowing the UE to estimate whether the UE is moving away from or approaching the base station; the UE compensates by the change in its geographical co-ordinates, derived by GPS for example. These are examples of the UE maintaining, estimating or updating its timing advance transmission parameter based on side information)

There are various ways of ways of choosing/defining the preamble to use:

The said preamble can be a subset of the existing preambles but reserved for use in validation of timing advance (i.e. reserved for use in the context of this invention).

The said preamble can be one of a new set of preambles (potentially with a different structure to the structure used for PRACH resources) in separate preamble resources.

In addition, each coverage enhancement (CE) level can use a different set of the said preambles. For example, a set of preambles can be defined for use with CE level 0. A subset of the CE level 0 preambles can be reserved for validation of timing advance for UEs in CE level 0. A subset of the CE level 1 preambles can be reserved for validation of timing advance for UEs in CE level 1 etc.

In some examples the time window A 800 can span one or more subframes. In the case that the time window A 800 spans more than one subframe, the UE can choose which subframe it transmits its preamble in, but the preamble has to be timing advanced relative to the boundary of the chosen subframe.

According to other example embodiments, the time window A can refer to multiple sets of preconfigured resources.

Figure 9:
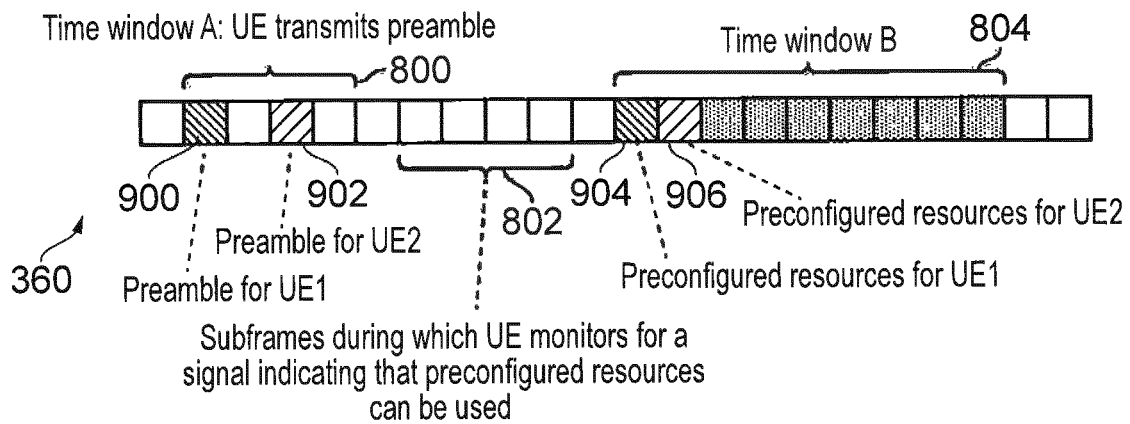
FIG. 9 is a schematic representation of uplink subframes of a wireless access interface corresponding to FIG. 8 illustrating transmission and reception by two communications devices when performing the transmission parameter confirmation procedure according to an example embodiment of the present technique.

FIG. 9 provides a corresponding example for the transmission by two UEs, UE1 506, UE2 508 in correspondence with the example shown in FIG. 8 in which each of the UEs UE1 506, UE2 508 transmit a preamble in a different sub-frame 900, 902 of the first window A 800. After monitoring for feedback from the eNB during a window of time 802 as for the example of FIG. 8, the UEs UE1 506, UE2 508 transmit in different sub-frames of the 904, 906 of the second window B 804. Accordingly the example of FIG. 9 illustrates an arrangement in time window B 804, the first subframe 904 contains preconfigured resources for UE1 and the second subframe 906 contains preconfigured resources for UE2. Both UE1 and UE2 transmit a PRACH preamble within time window A.

It should be appreciated that the resources used for the preamble in time window A 800 may be orthogonal to those used for time window B 802. For example the preambles in time window A 800 are transmitted in different physical resource blocks to the physical resource blocks used to transmit the PUSCH in preconfigured resources in time window B.

Figure 10:
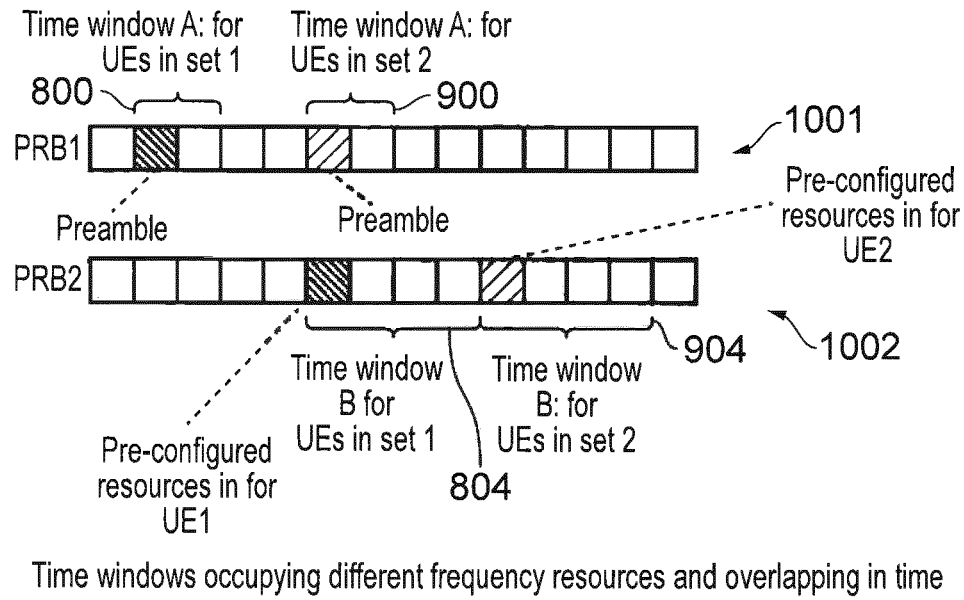
FIG. 10 is a schematic representation of uplink subframes of a wireless access interface corresponding to FIG. 9 illustrating transmission and reception by two communications devices when performing the transmission parameter confirmation procedure when configured for different groups of communications devices according to an example embodiment of the present technique.

It should also be appreciated that time window A 800 and time window B 804 can overlap in the time domain, as shown in FIG. 10. According to the example shown in FIG. 10 time window A 800 and time window B 804 are supported by different physical resources in the frequency domain. FIG. 10 therefore provides an example illustrating that while UE1 506 is transmitting using preconfigured resources of window B 804 in PRB2 1002 for UEs in a first set, UE2 508 is transmitting a preamble in PRB1 1001 in its time window A 900 allocated for a different set of UEs, which are configured for transmitting in a pre-configured resources of time window B 904 for the different set of UEs.

According to the example shown in FIG. 9, the eNB 504 is configured to detect one or more preambles transmitted by one of more UEs 506, 508 because there may be preambles transmitted by more than one UE 506, 508. If the timing of the received preambles falls within a time range which is expected by the eNB 504, the eNB 504 transmits a signal which indicates that the preconfigured resources in time window B 804 can be used. An example of the time range expected by the eNB is the cyclic prefix duration of uplink transmissions relative to subframe boundaries. For example a downlink control information (DCI) message can be used to confirm that the UE can proceed to transmit in the pre-configured resources. In one example the DCI carries an RNTI which is assigned for the use of signalling this functionality. In another example, the signalling can be carried on a DCI format that is assigned for the use of signalling this functionality. The DCI can indicate a single bit that either allows ALL or NONE of the UEs to use the preconfigured resources in time window B.

According to another example embodiment a UE may be configured with a plurality of different preambles, one of which can be selected by the UE for transmission in a time window A. Signals transmitted by the eNB in response to detecting preambles transmitted by one or more UEs can indicate those preambles which were received with a correct timing. A UE that had transmitted one of these preambles can then use the preconfigured resources. According to this example embodiment:

The signal transmitted from the eNB in response to the detected preamble can be a DCI containing a bitmap indicating which preambles meet the timing advance criteria and hence which UEs are able to transmit in the preconfigured PUSCH resources.

Alternatively, there may be separate DCIs for each preamble received by the eNodeB, where the DCIs may be distinguished through the use of an RNTI that is a function of the preamble received.

Alternatively, the signal transmitted by the eNB in response to a detected preamble indicating to the UE that preconfigured resources can be used may be UE specific with a UE specific RNTI. This RNTI can be a function of the Resume ID, when the UE is suspended and moved to Idle Mode. Alternatively, if the UE is in connected mode but in very long DRX, this UE specific RNTI is the C-RNTI. In an example of this mode of operation, each UE which has preconfigured resources in time window B has an associated preamble. When the eNB detects this preamble within a correct timing range, the eNB understands which UE sent the preamble and can then send the indication UE-specifically to that UE.

Alternatively, the signal transmitted by the eNB in response to a detected preamble indicating to the UE that preconfigured resources can be used is carried by a MAC message transmitted via a PDSCH. This PDSCH is scheduled by a DCI that is masked with an RNTI, where the RNTI can be reserved for the use of confirmation of ability to use preconfigured resources. The MAC message can contain the preamble indices that were received in the correct timing range, hence indicating those UEs that are allowed to use preconfigured resources in time window B.

Alternatively, the signal transmitted by the eNB in response to a plurality of preambles can be a modified RAR message. Here the RAR is scheduled by a DCI that has its CRC masked with a RA-RNTI (where the RA-RNTI corresponds to the resources used by the UE to transmit the preamble). The MAC subheader of the RAR contains the "RAPID" field which indicates which preamble the RAR is responding to. The said modified RAR need only contain the Timing Advance field which tells the plurality of UEs the adjustment in timing advance they require. In another example the modified RAR also contains the power control command (TPC). In another example, the Timing Advance field of the RAR is a simple 1 bit field to indicate whether the UE it is responding to has a correct or incorrect timing advance. This 1 bit timing advance validation field may also be used to tell the UE whether it can use the preconfigured resource or not. It should be noted that there can be multiple RAR in a single RAR message where each RAR addresses a single UE.

According to another example arrangement UEs are restricted in that only a single preamble can be transmitted in time window A 800. However, each of a set of UEs can use this preamble for validating transmission parameters before transmitting in the preconfigured resources i.e more than one UE can transmit exactly the same preamble. If the eNB 504 detects some received preamble energy outside its correct timing range, it does not signal that the preconfigured resources can be used. In this case, all the UEs that had intended to use preconfigured resources in time window B would perform a PRACH procedure according to FIG. 4.

In some embodiments the eNB does not transmit a signal if it cannot detect a preamble transmitted by a UE in window A 800. In other embodiments the eNB explicitly transmits a signal which indicates that the UE cannot use the preconfigured resources. This lack of response signal or explicit feedback signal indicates that the preconfigured resources in time window B cannot be used by the UE. In this case, UEs would use conventional procedures for transmitting their uplink data, for example by initiating a PRACH procedure according to FIG. 4 or transmitting data via early data transmission techniques.

In some example embodiments, UEs that receive an indication that they cannot use the preconfigured resources or do not receive an indication that they can use the preconfigured resources can either:
  Initiate a PRACH procedure at a randomly chosen time during time window B to access shared communications resources according to a conventional technique. Note that the PRACH procedure may be executed during time window B using different frequency resources to those used for the PUSCH predetermined resources.
  Initiate a PRACH procedure at the timing of their preconfigured resources to access shared communications resources according to a conventional technique, but not necessarily using the other attributes of the preconfigured resources.

Figure 11:
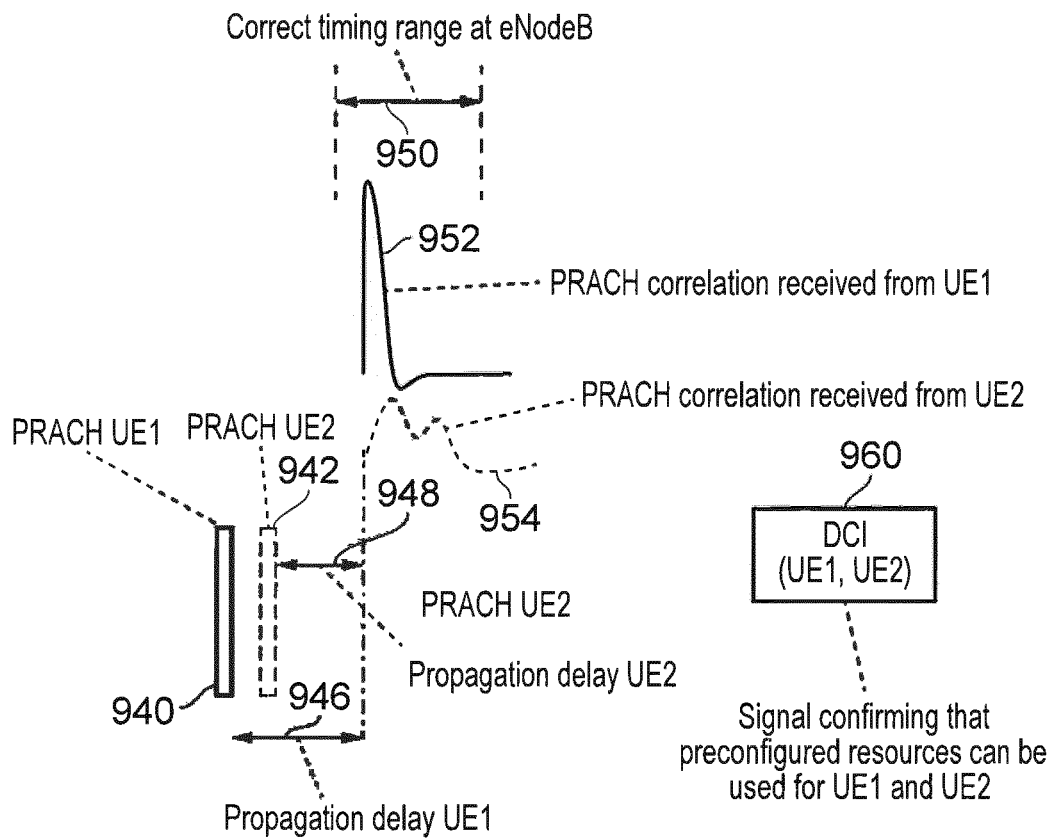
FIG. 11 is a schematic representation of an effect of two communications devices transmitting preamble signals each with correct timing advance as detected by a receiver at an infrastructure equipment.
Figure 12:
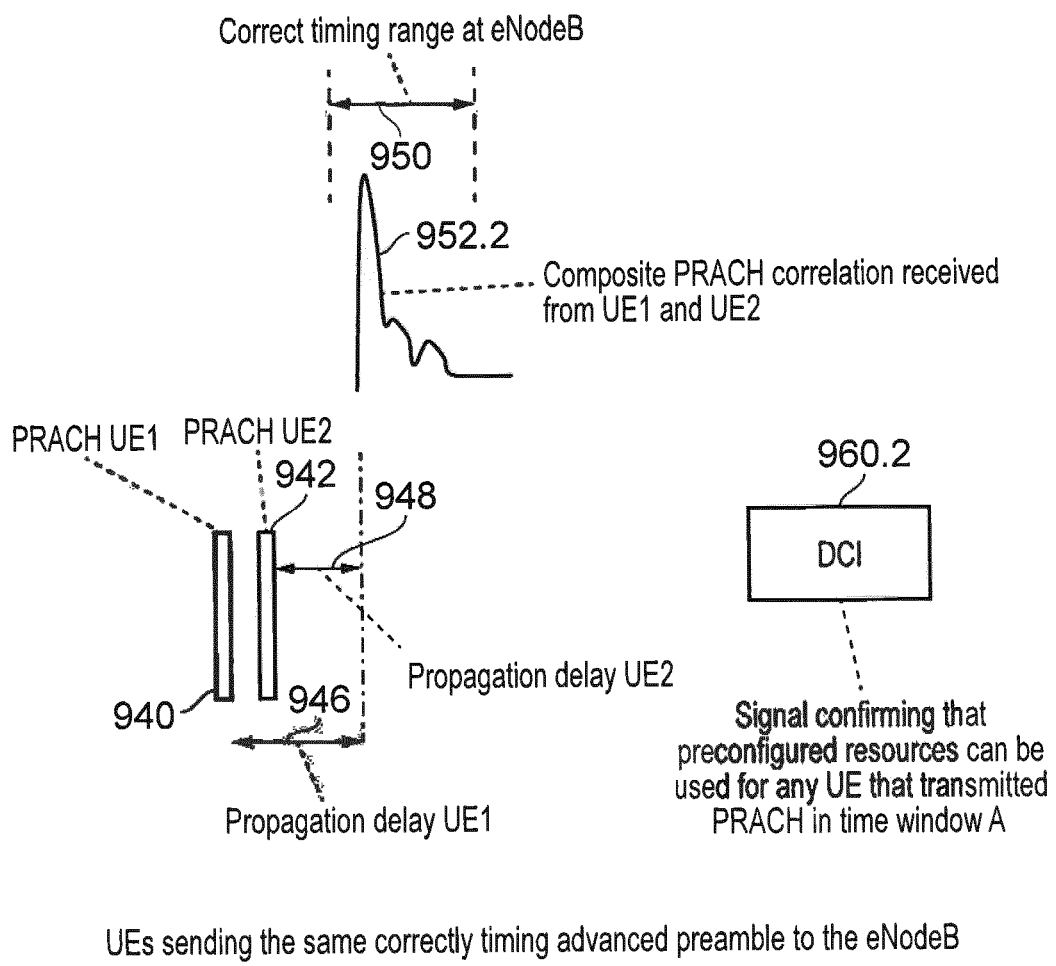
FIG. 12 is a schematic representation of an effect of two communications devices transmitting preamble signals each with correct timing advance as detected by a receiver at an infrastructure equipment with each communications device transmitting the same preamble.
Figure 13:
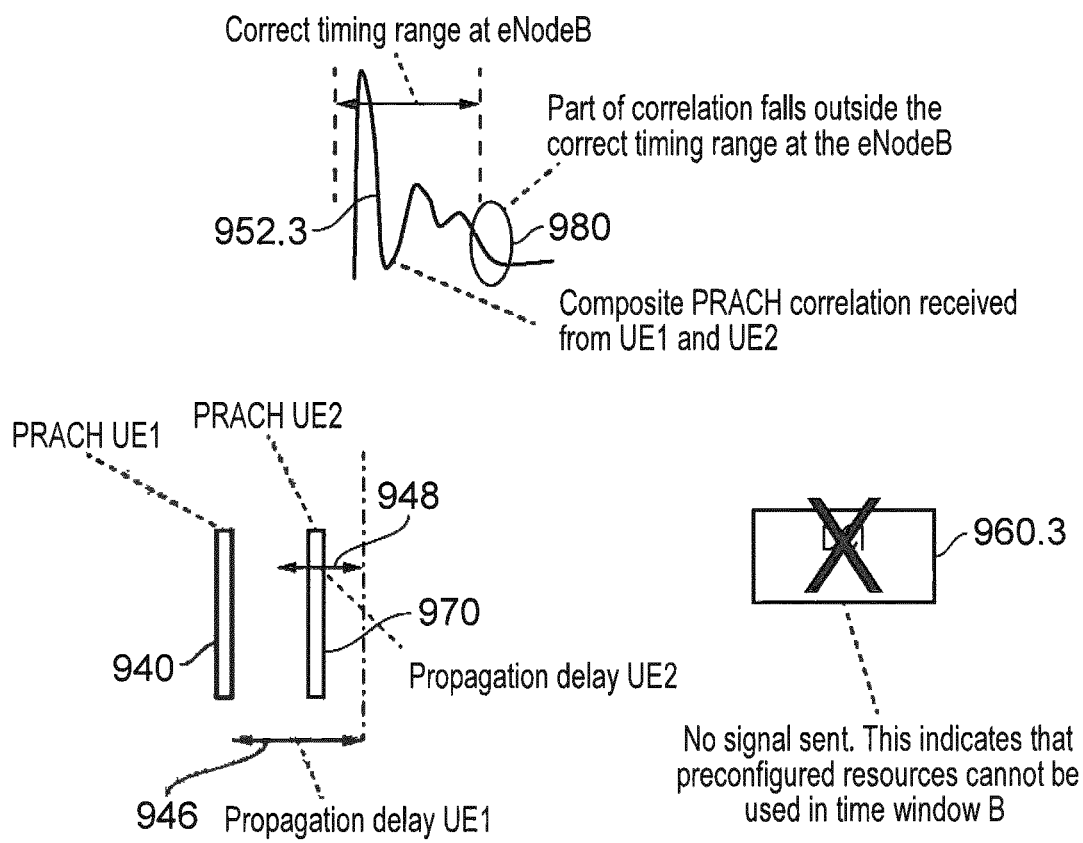
FIG. 13 is a schematic representation of an effect of two communications devices transmitting preamble signals one with correct timing advance and one an incorrect timing advance as detected by a receiver at an infrastructure equipment with each communications device transmitting the same preamble.

FIGS. 11, 12 and 13 illustrate an effect of detecting preambles transmitted by different UEs, UE1 506, UE2 508 within a physical random access channel (PRACH). FIG. 11 provides an illustrative example in which two UEs UE1, UE2 transmit unique preambles within the time window A 800 in the same subframe. UE2 is closer to the eNB than UE1 and hence applies less timing advance to its PRACH preamble than that applied by UE1.

As shown in FIG. 11 in a first example, a UE1 transmits a PRACH signal represented by a block with a solid line 940 whereas the second UE transmits a different PRACH signal represented by dashed-line block 942. As indicated by a first double headed arrow 946 a propagation delay of UE 1 is greater than a propagation delay from UE 2 represented by a doubled headed arrow 948. A third double headed arrow 950 illustrates a range indicating a timing range within which the eNB determines that the preamble should arrive. The timing range 950 is an example of an acceptable tolerance of the timing of the preamble, as defined for example by a cyclic prefix timing range. If the preamble is received within a cyclic prefix timing range then the eNB would then have confidence that when the UE transmits in the preconfigured resources, the transmitted signals would arrive with a timing error bounded by the cyclic prefix duration and could therefore be detected by the eNB. Another example of an acceptable tolerance would be a range of reception powers of the preamble (if the reception power of the preamble is within the said range of reception powers, the tolerance is acceptable). A graphical plot of amplitude with respect to time at an output of a detector at the eNB is represented by a solid line 952 for the UE1, and a dotted line representing a graphical plot of amplitude with respected time for the second UE 954. According to this illustrative example, the eNB detects the preambles from both the UE 1 and UE 2 within a detection timing range line 950. The eNB therefore transmits a feedback signal as a DCI message indicating that the preconfigured resources can be used by UE1 and UE2 as represented by a process box 960.

In the example shown in FIG. 11, both UEs UE1, UE2 correctly calculate their required timing advance and the correlated preambles arrive within the correct timing range at the eNB. Hence the eNB sends a DCI signal indicating that both UE1 and UE2 can use PUSCH in the preconfigured resources. The UEs will then transmit PUSCH in the preconfigured resources using the timing advance they applied to their respective PRACH preambles.

FIG. 12 provides a corresponding example to that shown in FIG. 11, in which the two UEs transmit the same preamble within time window A in the same subframe. UE2 is closer to the eNodeB than UE1 and hence applies less timing advance to its PRACH preamble than UE1 does. In this example, the eNB correlates for the known preamble and the received correlation relates to a composite signal of the preambles transmitted by UE1 and UE2 as indicated by the graphical plot of amplitude with respect to time 952.2 at an output of a detector at the eNB. Since the whole of the composite correlation is received within the correct timing range of the eNB, both UE1 and UE2 must have sent the PRACH preamble with a correctly estimated timing advance. Hence the eNB in the process step 960.2 sends a signal (in this case a DCI) indicating that any UE that had transmitted a preamble in timing window A can use the preconfigured PUSCH resources in time window B.

FIG. 13 provides an example in which two UEs transmit the same preamble within time window A in the same subframe, but in contrast to the examples of FIGS. 11 and 12, the UE2 does not apply a correct timing advance. As shown in FIG. 13 UE2 transmits its PRACH with too little timing advance for its propagation delay. As a result of UE2's incorrectly timing advanced PRACH, the correlation of the composite received signal 952.3 contains significant energy outside the correct timing range of the detection window 950 in a bubble 980 which is outside a correct timing advance tolerance range. Hence the eNB does not allow the use of the preconfigured resources in timing window B and does not transmit a signal to the UEs, where the signal would have allowed the use of the preconfigured resources.

The example embodiments described above have been described with respect to timing advance, but the procedure can also be applied with respect to transmit power. For this example, the UE transmits a preamble at a power level that it intends to use in the preconfigured resources and if the UE receives a confirming signal from the eNodeB, it transmits using that power in the preconfigured resources.

Phase 3: eNodeB Updates the UE with New Status Information on its Timing Advance State Returning the process flow diagram of FIG. 6, optionally, after the eNB 504 has transmitted signals in the preconfigured resources, the eNB 504 may then transmit an update of the one or more transmission parameters represented by an arrow 608. This corresponds to phase 3 mentioned above. For example the eNB 504 after receiving signals representing data transmitted by the UE 506 as represented by the arrow 606, the eNB 504 may perform measurements of the received signal such as detecting a synchronisation with respect to the frame structure of the uplink and a transmission power. Accordingly, the eNB may optionally transmit feedback to the UE 506 as represented by the arrow 608 indicating whether the timing advance is accurate and whether the transmission power is within a predetermined range. Therefore in process step 610 the UE may update the one or more transmission parameters with information received from the eNB so that the next transmission in the preconfigured resources is adapted in accordance with these updates.

As another example, the eNB 504 may transmit a message to instruct the UE to perform a conventional PRACH procedure to that shown in FIG. 4 in order to reset its timing advance. This indication could be transmitted using a DCI, MAC control element or RRC signalling. Equivalently, the eNodeB can indicate to the UE that it is not allowed to use PUSCH in the preconfigured resources for its next uplink transmission.

In other words, once the UE has transmitted in the uplink using the preconfigured resources, the eNodeB takes steps to ensure that the UE uses a correct timing advance when it next transmits in the uplink. This can be done by either sending a timing advance command to the UE or by indicating to the UE that it needs to use the legacy PRACH procedure for its next uplink transmission, as described in the embodiment below.

eNB Signals if it has Changed the Timing of its Uplink Relative to its Downlink

As illustrated by the diagram provided in FIG. 3 by the arrow 384, in some examples there may by an offset between the synchronisation of the uplink and the downlink of the wireless access interface. If this offset changes then according to some embodiments, the eNB may transmit signalling messages to the UE to inform the UE when the eNB changes the timing offset between its downlink and uplink.

A common assumption would be that, from the eNB perspective, the timing offset of the uplink relative to the downlink does not change. For example the eNB's uplink can be synchronised to its downlink in terms of frequency with no time offset between uplink and downlink. However this assumption is not generally valid and the eNB can change the timing of its uplink relative to that of its downlink. The eNB can manage the changing relative timing by sending timing advance commands to the UE, however this is not possible if the UE goes to sleep between times at which it transmits in the uplink.

In one example embodiment, the eNB signals that there is a change in the relative timing of the uplink and downlink. The UE monitors this signal before transmitting in the preconfigured resources of the uplink. For example, the eNB signals whether there has been a change in uplink timing with respect to the downlink timing using system information (SI) and the UE monitors SI before transmitting using the preconfigured resources. If there has been a change in uplink with respect to downlink timing, the UE either compensates for the timing change (using the value signalled in SI) before transmitting on the preconfigured resources or it initiates a PRACH procedure before transmitting PUSCH.

According to another example the eNB may prohibit use of the preconfigured resources when the timing between the uplink and the downlink changes, change the timing offset at the eNB and then re-allow UEs to use preconfigured resources once the UEs have performed a normal PRACH procedure. In this way, each UE would obtain updated timing advance information through the process of performing the PRACH procedure.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/ predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches are not limited to machine type communications devices/IoT devices or other narrowband communications devices, but can be applied more generally, for example in respect of any type communications device operating with a wireless link to the communication network.

It will further be appreciated that the principles described herein are not applicable only to LTE-based wireless telecommunications systems, but are applicable for any type of wireless telecommunications system that supports a random access procedure comprising an exchange of random access procedure messages between a communications device and a base station.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of transmitting data by a communications devices in a wireless communications network, the method comprising
- performing a procedure to determine whether the communications device can transmit signals in the preconfigured resources of the uplink, and
- if the communications device determines that it can transmit signals in the preconfigured resources, transmitting signal representing the data in the preconfigured resources, wherein the procedure to determine whether the communications device can transmit signals in the preconfigured resources of the uplink includes a transmission parameter confirmation procedure which confirms that a value of one or more transmission parameters to be used for transmitting the signals representing the data can be used for the signals representing the data to be detected by an infrastructure equipment of the wireless communications network.

Paragraph 2. A method according to paragraph 1, wherein the one or more criteria for the communications device to transmit data in the preconfigured resources of the wireless access network includes an indication that the communications device should confirm the validity of the one or more transmission parameters from the infrastructure equipment of the wireless communications network before transmitting the signals representing the data in the preconfigured resources.

Paragraph 3. A method according to paragraph 1 or 2, wherein the transmission parameter confirmation procedure includes
- monitoring a value of one or more detectable parameters providing side information, the value of the side information being dependent on a physical location of the communications device,
- comparing the value of the one or more detectable parameters of the side information when the value of the one or more transmission parameters were last acquired from the infrastructure equipment with a current value of the one or more detectable parameters before transmitting the signals representing the data in the preconfigured resources of the wireless access interface, and
- if the comparison indicates that the communications device is at the same physical location, transmitting the signals representing the data in the preconfigured resources using the value of the one or more transmission parameters last acquired from the infrastructure equipment.

Paragraph 4. A method according to paragraph 1, 2 or 3, the transmission parameter confirmation procedure includes
- transmitting a preamble in accordance with a random access procedure in a predetermined physical channel of the wireless access interface, the preamble being transmitted with the value of the one or more transmission parameters,
- determining whether the preamble was detected when transmitted with the value of the one or more transmission parameters, and
- if the preamble was detected, transmitting the signals representing the data in the preconfigured resources using the value of one or more transmission parameters.

Paragraph 5. A method according to paragraph 4, wherein the determining whether the preamble was detected when transmitted with the value of the one or more transmission parameters comprises detecting a response signal transmitted by the infrastructure equipment or the absence of a response signal transmitted by the infrastructure equipment.

Paragraph 6. A method according to paragraph 4 or 5, wherein if the preamble was not detected when transmitted then performing a random access procedure in which the one or more transmission parameters are acquired from the infrastructure equipment.

Paragraph 7. A method according to any of paragraphs 1 to 6, comprising receiving an indication of one or more criteria for the communications device to transmit data in preconfigured resources of an uplink of a wireless access interface provided by the wireless communications network, the procedure to determine whether the communications device can transmit signals in the preconfigured resources of the uplink including determining from the criteria indicating conditions for the communications device to transmit in the preconfigured resources whether the communications device satisfies the one or more criteria.

Paragraph 8. A method according to any of paragraphs 1 to 7, comprising receiving in response to transmitting the signals representing the data in the preconfigured resources an indication from the infrastructure equipment of a correct value of the one or more transmission parameters.

Paragraph 9. A method according to any of paragraphs 1 to 7, comprising receiving in response to transmitting the signals representing the data in the preconfigured resources an indication from the infrastructure equipment that the communications device should perform a random access procedure for accessing communications resources of the uplink for transmitting the data after grant from the infrastructure equipment.

Paragraph 10. A method according to any of paragraphs 1 to 9, comprising receiving an indication from the infrastructure equipment that a relative timing between an uplink of the wireless access interface and a downlink of the wireless access interface has changed, and in response performing a random access procedure to re-acquire the one or more transmission parameters.

Paragraph 11. A method according to any of paragraphs 1 to 10, wherein the one of the transmission parameters is a timing advance for transmitting signals to accommodate a propagation delay between the communications device and the infrastructure equipment so that the transmitted signals are received at the infrastructure equipment within a detection window corresponding to a time divided channel.

Paragraph 12. A method according to any of paragraphs 1 to 10, wherein the one of the transmission parameters is a transmission power of the transmitted signals to accommodate a propagation path loss between the communications device and the infrastructure equipment so that the transmitted signals are received at the infrastructure equipment within a required range of power.

Paragraph 13. A communications device for transmitting data via a wireless communications network, the communications device comprising receiver circuitry for receiving signals from an infrastructure equipment on a downlink of a wireless access interface, transmitter circuitry for transmitting signals to the infrastructure equipment via an uplink of a wireless access interface, and control circuitry for controlling the transmitter circuitry to transmit signals representing data via preconfigured resources of the uplink of the wireless access interface by performing a procedure to determine whether the communications device can transmit signals in the preconfigured resources of the uplink, and if the communications device determines that it can transmit signals in the preconfigured resources, transmitting the signals representing the data in the preconfigured resources, wherein the procedure to determine whether the communications device can transmit signals in the preconfigured resources of the uplink includes a transmission parameter confirmation procedure which confirms that a value of one or more transmission parameters to be used for transmitting the signals representing the data can be used for the signals representing the data to be detected by an infrastructure equipment of the wireless communications network.

Paragraph 14. A communications device according to paragraph 13, wherein the one or more criteria for the communications device to transmit data in the preconfigured resources of the wireless access network includes an indication that the communications device should confirm the validity of the one or more transmission parameters from the infrastructure equipment of the wireless communications network before transmitting the signals representing the data in the preconfigured resources.

Paragraph 15. A communications device according to paragraph 13 or 14, wherein the transmission parameter confirmation procedure performed by the control circuitry comprises monitoring a value of one or more detectable parameters providing side information, the value of the side information being dependent on a physical location of the communications device, comparing the value of the one or more detectable parameters of the side information when the value of the one or more transmission parameters were last acquired from the infrastructure equipment with a current value of the one or more detectable parameters before transmitting the signals representing the data in the preconfigured resources of the wireless access interface, and if the comparison indicates that the communications device is at the same physical location, transmitting the signals representing the data in the preconfigured resources using the value of the one or more transmission parameters last acquired from the infrastructure equipment.

Paragraph 16. A communications device according to paragraph 13, 14 or 15, wherein the transmission parameter confirmation procedure performed by the control circuitry comprises transmitting a preamble in accordance with a random access procedure in a predetermined physical channel of the wireless access interface, the preamble being transmitted with the value of the one or more transmission parameters, determining whether the preamble was detected when transmitted with the value of the one or more transmission parameters, and if the preamble was detected, transmitting the signals representing the data in the preconfigured resources using the value of one or more transmission parameters.

Paragraph 17. A communications device according to paragraph 13, 14 or 15, wherein the controller circuitry is configured with the receiver circuitry to determine whether the preamble was detected when transmitted with the value of the one or more transmission parameters by detecting a response signal transmitted by the infrastructure equipment or the absence of a response signal transmitted by the infrastructure equipment.

Paragraph 18. A communications device according to paragraph 16 or 17, wherein the controller circuitry is configured with the transmitter circuitry and the receiver circuitry to perform a random access procedure in which the one or more transmission parameters are acquired from the infrastructure equipment, if the controller circuitry determines that the preamble was not detected by the infrastructure equipment.

Paragraph 19. A communications device according to any of paragraphs 13 to 18, wherein the controller circuitry is configured in combination with the receiver circuitry to receive an indication of one or more criteria for the communications device to transmit data in preconfigured resources of the uplink of the wireless access interface, the criteria indicating conditions for the communications device to transmit in the preconfigured resources.

Paragraph 20. A communications device according to any of paragraphs 13 to 19, wherein the controller circuitry is configured in combination with the receiver circuitry to receive in response to transmitting the signals representing the data in the preconfigured resources an indication from the infrastructure equipment of a correct value of the one or more transmission parameters.

Paragraph 21. A communications device according to any of paragraphs 13 to 20, wherein the controller circuitry is configured in combination with the receiver circuitry to receive in response to transmitting the signals representing the data in the preconfigured resources an indication from the infrastructure equipment that the communications device should perform a random access procedure for accessing communications resources of the uplink for transmitting the data after grant from the infrastructure equipment.

Paragraph 22. A communications device according to any of paragraphs 13 to 21, wherein the controller circuitry is configured in combination with the receiver circuitry to receive an indication from the infrastructure equipment that a relative timing between an uplink of the wireless access interface and a downlink of the wireless access interface has changed, and the controller circuitry is configured in response perform a random access procedure to re-acquire the one or more transmission parameters. Paragraph 23. A communications device according to any of paragraphs 13 to 22, wherein the one of the transmission parameters is a timing advance for transmitting signals to accommodate a propagation delay between the communications device and the infrastructure equipment so that the transmitted signals are received at the infrastructure equipment within a detection window corresponding to a time divided channel.

Paragraph 24. A communications device according to any of paragraphs 1 to 10, wherein the one of the transmission parameters is a transmission power of the transmitted signals to accommodate a propagation path loss between the communications device and the infrastructure equipment so that the transmitted signals are received at the infrastructure equipment within a required range of power.

Paragraph 25. A method of receiving data at an infrastructure equipment of a wireless communications network, comprising
  configuring an uplink of a wireless access interface with preconfigured communications resources, the communications resources being preconfigured for receiving signals representing data transmitted by communications devices without being requested by the communications devices and granted by the infrastructure equipment,
  detecting a preamble transmitted by one of the communications devices with one or more transmission parameters,
  transmitting a feedback signal to the communications device indicating that the preamble was received, and
  receiving signals representing the data from the communications device, the signals being transmitted in the preconfigured communications resources.

Paragraph 26. A method according to paragraph 25, wherein the detecting the preamble transmitted by one of the communications devices with the one or more transmission parameters comprises detecting the preamble transmitted in accordance with a random access procedure in a predetermined physical channel of the wireless access interface, the preamble being transmitted by the communications device with a value of the one or more transmission parameters.

Paragraph 27. A method according to paragraph 26, wherein the transmitting the feedback signal to the communications device indicating that the preamble was received comprises
  determining whether the preamble was detected with an acceptable tolerance when transmitted with the value of the one or more transmission parameters, and
  if the preamble was detected, transmitting an indication to the communication device that the communication device can transmit in the preconfigured resource, and the receiving signals representing the data from the communications device includes
  receiving the signals representing the data in the preconfigured resources transmitted by the communications device with the value of one or more transmission parameters.

Paragraph 28. An infrastructure equipment forming part of a wireless communications network, the infrastructure equipment comprising
  receiver circuitry for receiving signals transmitted by one or more communications devices on an uplink of a wireless access interface,
  transmitter circuitry for transmitting signals to the one or more communications devices via a downlink of a wireless communications network, and
  control circuitry for controlling the transmitter circuitry and the receiver circuitry, and the control circuitry is configured to
  configure an uplink of a wireless access interface with preconfigured communications resources, the communications resources being preconfigured for receiving signals representing data transmitted by the one or more communications devices without being requested by the communications devices and without being granted by the infrastructure equipment, and the control circuitry is configured in combination with the receiver circuitry and transmitter circuitry
    to detect a preamble transmitted by one of the communications devices with one or more transmission parameters,
    to transmit a feedback signal to the communications device indicating that the preamble was received, and
    to receive signals representing the data from the communications device, the signals being transmitted in the preconfigured communications resources.

Paragraph 29. An infrastructure equipment according to paragraph 28, wherein the control circuitry is configured in combination with the receiver to detect the preamble transmitted in accordance with a random access procedure in a predetermined physical channel of the wireless access interface, the preamble being transmitted by the communications device with a value of the one or more transmission parameters.

Paragraph 30. An infrastructure equipment according to paragraph 29, wherein the control circuitry is configured in combination with the receiver circuitry and transmitter circuitry
  to determine whether the preamble was detected with an acceptable tolerance when transmitted with the value of the one or more transmission parameters, and
  if the preamble was detected, to transmit an indication to the communication device that the communication device can transmit in the preconfigured resource, and
  to receive the signals representing the data in the preconfigured resources transmitted by the communications device with the value of one or more transmission parameters.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] 3GPP TS 38.300 v. 15.2.0 "NR; NR and NG-RAN Overall Description; Stage 2 (Release 15)", June 2018
[2] Holma H. and Toskala A, "LTE for UMTS OFDMA and SC-FDMA based radio access", John Wiley and Sons, 2009
[3] TR 38.913, "Study on Scenarios and Requirements for Next Generation Access Technologies (Release 14)".
[4] 3GPP TS 36.321 "Evolved Universal Terrestrial Radio Access (E-UTRA); Medium Access Control (MAC) protocol specification (Release 15)", v. 15.2.0
[5] 3GPP TS 36.212, "Evolved Universal Terrestrial Radio Access (E-UTRA); Multiplexing and channel coding (Release 15)", v. 15.1.0
[6] RP-170732, "New WID on Even further enhanced MTC for LTE," Ericsson, Qualcomm, RAN #75
[7] RP-170852, "New WID on Further NB-IoT enhancements," Huawei, HiSilicon, Neul, RAN #75
[8] RP-181450, "New WID on Rel-16 MTC enhancements for LTE," Ericsson, RAN #80
[9] RP-181451, "New WID on Rel-16 enhancements for NB-IoT," Ericsson, Huawei, RAN #80
Annex 1
LTE Wireless Access Interface
Embodiments of the present technique are not limited to a particular wireless communications standard, but find general application with a mobile communications system in which a transmitter and a receiver are configured to communicate data in units, transport blocks or packets for which some indication of feedback is provided as part of an ARQ type protocol. However, the following example embodiments will be explained with reference to a 3GPP defined LTE architecture. Those acquainted with LTE will appreciate that a wireless access interface configured in accordance with an LTE standard uses an orthogonal frequency division modulation (OFDM) based wireless access interface for the radio downlink (so-called OFDMA) and a single carrier frequency division multiple access scheme (SC-FDMA) on the radio uplink. The down-link and the up-link of a wireless access interface according to an LTE standard is presented in FIGS. 14 and 15.

FIG. 14 provides a simplified schematic diagram of the structure of a downlink of a wireless access interface that may be provided by or in association with the eNB of FIG. 1 when the communications system is operating in accordance with the LTE standard. In LTE systems the wireless access interface of the downlink from an eNB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHZ and 20 MHz bandwidth may be divided into orthogonal subcarriers. Not all of these subcarriers are used to transmit data (some are used to carry reference information used for channel estimation at the receiver for example) whilst some at the edge of the band are not used at all. For LTE, the number of subcarriers varies between 72 subcarriers (1.4 MHz) and 1200 subcarriers (20 MHz), but it will be appreciated that for other wireless access interfaces, such as NR or 5G, the number of sub-carriers and the bandwidth may be different. In some examples the subcarriers are grouped on a basis of $2^n$, for example 128 to 2048, so that both a transmitter and a receiver can use an inverse and a forward Fast Fourier Transform to convert the sub-carriers from the frequency domain to the time domain and from the time domain to the frequency domain respectively. Each subcarrier bandwidth may take any value but in LTE it is fixed at 15 kHz.

As shown in FIG. 14, the resources of the wireless access interface are also temporally divided into frames where a frame 200 lasts 10 ms and is subdivided into 10 sub-frames 1201 each with a duration of 1 ms. Each sub-frame 201 is formed from 14 OFDM symbols and is divided into two slots 1220, 1222 each of which comprise six or seven OFDM symbols depending on whether a normal or extended cyclic prefix is being utilised within OFDM symbols for the reduction of inter symbol interference. The resources within a slot may be divided into resources blocks 1203 each comprising 12 subcarriers for the duration of one slot and the resource blocks are further divided into resource elements 1204 which span one subcarrier for one OFDM symbol, where each rectangle 1204 represents a resource element. The resource elements distributed in time within a sub-frame and frequency across the host system bandwidth represent the communications resources of the host system.

The simplified structure of the downlink of an LTE wireless access interface presented in FIG. 14, also includes an illustration of each sub-frame 1201, which comprises a control region 1205 for the transmission of control data, a data region 1206 for the transmission of user data and reference signals 207 which are interspersed in the control and data regions in accordance with a predetermined pattern.

The control region 1205 may contain a number of physical channels for the transmission of control data, such as a physical downlink control channel (PDCCH), a physical control format indicator channel (PCFICH) and a physical HARQ indicator channel (PHICH). The data region may contain a number of physical channels for the transmission of data or control, such as a physical downlink shared channel (PDSCH), enhanced physical downlink control channel (ePDCCH) and a physical broadcast channel (PBCH). Although these physical channels provide a wide range of functionality to LTE systems, in terms of resource allocation and the present disclosure, PDCCH and PDSCH are most relevant. Further information on the structure and functioning of the physical channels of LTE systems can be found in [1]. Resources within the PDSCH may be allocated by an eNodeB to UEs being served by the eNodeB. For example, a number of resource blocks of the PDSCH may be allocated to a UE in order that it may receive data that it had previously requested or data which is being pushed to it by the eNodeB, such as radio resource control (RRC) signalling. In FIG. 14, UE1 has been allocated resources 1208 of the data region 1206, UE2 resources 1209 and UE3 resources 1210. UEs in an LTE system may be allocated a fraction of the available resources for the PDSCH and therefore UEs are required to be informed of the location of their allocated resources within the PDCSH so that only relevant data within the PDSCH is detected and estimated. In order to inform the UEs of the location of their allocated communications resource elements, resource control information specifying downlink resource allocations is conveyed across the PDCCH in a form termed downlink control information (DCI), where resource allocations for a PDSCH are communicated in a preceding PDCCH instance in the same sub-frame.

FIG. 15 provides a simplified schematic diagram of the structure of an uplink of an LTE wireless access interface that may be provided by or in association with the eNodeB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations sub-frames switch between uplink and downlink sub-frames in accordance with predefined patterns. However, regardless of the form of duplexing used, a common uplink frame structure is utilised. The simplified structure of FIG. 3 illustrates such an uplink frame in an FDD implementation. A frame 1300 is divided into 10 sub-frames 301 of 1 ms duration where each sub-frame 301 comprises two slots 1302 of 0.5 ms duration. Each slot is then formed from seven OFDM symbols 1303 where a cyclic prefix 304 is inserted between each symbol in a manner equivalent to that in downlink sub-frames.

As shown in FIG. 15, each LTE uplink sub-frame may include a plurality of different channels, for example a physical uplink communications channel (PUSCH) 1305, a physical uplink control channel (PUCCH) 1306, and a physical random access channel (PRACH). The physical Uplink Control Channel (PUCCH) may carry control information such as ACK/NACK to the eNodeB for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink sub-frames may also include reference signals. For example, demodulation reference signals (DMRS) 1307 and sounding reference signals (SRS) 1308 may be present in an uplink sub-frame where the DMRS occupy the fourth symbol of a slot in which PUSCH is transmitted and are used for decoding of PUCCH and PUSCH data, and where SRS are used for uplink channel estimation at the eNodeB. The ePDCCH channel carries similar control information (DCI) as the PDCCH, but the physical aspects of PDCCH are different to those of ePDCCH, as discussed elsewhere herein. Further information on the structure and functioning of the physical channels of LTE systems can be found in [1].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNodeB. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink sub-frames, uplink sub-frames have a different control structure to downlink sub-frames, in particular the upper 1309 and lower 1310 subcarriers/frequencies/resource blocks of an uplink sub-frame are reserved for control signaling rather than the initial symbols of a downlink sub-frame. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulated in combination and therefore if efficient use of the available resources are to be made, contiguous frequency allocations for each UE may be preferable.

What is claimed is:

1. A method of transmitting data by a communications device in a wireless communications network, the method comprising; performing a procedure to determine whether the communications device can transmit signals in preconfigured resources of an uplink, determining that the communications device can transmit signals in the preconfigured resources of the uplink, and transmitting signals representing the data in the preconfigured resources, wherein the procedure to determine whether the communications device can transmit signals in the preconfigured resources of the uplink includes a transmission parameter confirmation procedure which confirms that a value of one or more transmission parameters to be used for transmitting the signals representing the data can be used for the signals representing the data to be detected by an infrastructure equipment of the wireless communications network, wherein one or more criteria for the communications device to transmit data in the preconfigured resources of the wireless communications network includes an indication that the communications device should confirm a validity of the one or more transmission parameters from the infrastructure equipment of the wireless communications network before transmitting the signals representing the data in the preconfigured resources.

2. The method as claimed in claim 1, wherein the transmission parameter confirmation procedure includes monitoring a value of one or more detectable parameters providing side information, the value of the one or more detectable parameters providing the side information being dependent on a physical location of the communications device, comparing the value of the one or more detectable parameters providing the side information when the value of the one or more transmission parameters were last acquired from the infrastructure equipment with a current value of the one or more detectable parameters providing the side information before transmitting the signals representing the data in the preconfigured resources of a wireless access interface, and when the comparison indicates that the communications device is at a same physical location, transmitting the signals representing the data in the preconfigured resources using the value of the one or more transmission parameters last acquired from the infrastructure equipment.

3. The method as claimed in claim 1, the transmission parameter confirmation procedure includes transmitting a preamble in accordance with a random access procedure in a predetermined physical channel of a wireless access interface, the preamble being transmitted with the value of the one or more transmission parameters, determining whether the preamble was detected when transmitted with the value of the one or more transmission parameters, and when the preamble was detected, transmitting the signals representing the data in the preconfigured resources using the value of the one or more transmission parameters.

4. The method as claimed in claim 3, wherein the determining whether the preamble was detected when transmitted with the value of the one or more transmission parameters comprises detecting a response signal transmitted by the infrastructure equipment or an absence of a response signal transmitted by the infrastructure equipment.

5. The method as claimed in claim 3, wherein when the preamble was not detected when transmitted with the value of the one or more transmission parameters performing a random access procedure in which the one or more transmission parameters are acquired from the infrastructure equipment.

6. The method as claimed in claim 1, comprising receiving an indication of one or more criteria for the communications device to transmit data in the preconfigured resources of the uplink of a wireless access interface provided by the wireless communications network, the procedure to determine whether the communications device can transmit signals in the preconfigured resources of the uplink including determining from the one or more criteria indicating conditions for the communications device to transmit in the preconfigured resources when the communications device satisfies the one or more criteria.

7. The method as claimed in claim 1, comprising receiving in response to transmitting the signals representing the data in the preconfigured resources an indication from the infrastructure equipment of a correct value of the one or more transmission parameters.

8. The method as claimed in claim 1, comprising receiving in response to transmitting the signals representing the data in the preconfigured resources an indication from the infrastructure equipment that the communications device should perform a random access procedure for accessing communications resources of the uplink for transmitting the data after grant from the infrastructure equipment.

9. The method as claimed in claim 1, comprising receiving an indication from the infrastructure equipment that a relative timing between the uplink of a wireless access interface and a downlink of the wireless access interface has changed, and in response performing a random access procedure to re-acquire the one or more transmission parameters.

10. The method as claimed in claim 1, wherein the one or more transmission parameters is a timing advance for transmitting signals to accommodate a propagation delay between the communications device and the infrastructure equipment so that the transmitted signals are received at the infrastructure equipment within a detection window corresponding to a time divided channel.

11. The method as claimed in claim 1, wherein the one or more transmission parameters is a transmission power of the transmitted signals to accommodate a propagation path loss between the communications device and the infrastructure equipment so that the transmitted signals are received at the infrastructure equipment within a required range of power.

12. A communications device for transmitting data via a wireless communications network, the communications device comprising: receiver circuitry for receiving signals from an infrastructure equipment on a downlink of a wireless access interface, transmitter circuitry for transmitting signals to the infrastructure equipment via an uplink of the wireless access interface, and control circuitry for controlling the transmitter circuitry to transmit signals representing data via preconfigured resources of the uplink of the wireless access interface by performing a procedure to determine whether the communications device can transmit signals in the preconfigured resources of the uplink, and when the communications device determines that it can transmit signals in the preconfigured resources, transmitting the signals representing the data in the preconfigured resources, wherein the procedure to determine whether the communications device can transmit signals in the preconfigured resources of the uplink includes a transmission parameter confirmation procedure which confirms that a value of one or more transmission parameters to be used for transmitting the signals representing the data can be used for the signals representing the data to be detected by an infrastructure equipment of the wireless communications network, wherein one or more criteria for the communications device to transmit data in the preconfigured resources of the wireless communications network includes an indication that the communications device should confirm a validity of the one or more transmission parameters from the infrastructure equipment of the wireless communications network before transmitting the signals representing the data in the preconfigured resources.

13. The communications device as claimed in claim 12, wherein the transmission parameter confirmation procedure performed by the control circuitry comprises monitoring a value of one or more detectable parameters providing side information, the value of the one or more detectable parameters providing the side information being dependent on a physical location of the communications device, comparing the value of the one or more detectable parameters providing the side information when the value of the one or more transmission parameters were last acquired from the infrastructure equipment with a current value of the one or more detectable parameters providing the side information before transmitting the signals representing the data in the preconfigured resources of the wireless access interface, and when the comparison indicates that the communications device is at a same physical location, transmitting the signals representing the data in the preconfigured resources using the value of the one or more transmission parameters last acquired from the infrastructure equipment.

14. The communications device as claimed in claim 12, wherein the transmission parameter confirmation procedure performed by the control circuitry comprises transmitting a preamble in accordance with a random access procedure in a predetermined physical channel of the wireless access interface, the preamble being transmitted with the value of the one or more transmission parameters, determining whether the preamble was detected when transmitted with the value of the one or more transmission parameters, and when the preamble was detected, transmitting the signals representing the data in the preconfigured resources using the value of the one or more transmission parameters.

15. The communications device as claimed in claim 12, wherein the control circuitry is configured with the receiver circuitry to determine whether a preamble was detected when transmitted with the value of the one or more transmission parameters by detecting a response signal transmitted by the infrastructure equipment or an absence of a response signal transmitted by the infrastructure equipment.

16. The communications device as claimed in claim 12, wherein the control controller circuitry is configured in combination with the receiver circuitry to receive an indication of one or more criteria for the communications device to transmit data in the preconfigured resources of the uplink of the wireless access interface, the criteria indicating conditions for the communications device to transmit in the preconfigured resources.

17. The communications device as claimed in claim 12, wherein the one or more transmission parameters is a timing advance for transmitting signals to accommodate a propagation delay between the communications device and the infrastructure equipment so that the transmitted signals are received at the infrastructure equipment within a detection window corresponding to a time divided channel.

18. Circuitry for transmitting data in a wireless communications network, the circuitry comprising: circuitry for performing a procedure to determine whether a communications device can transmit signals in preconfigured resources of an uplink, and circuitry for transmitting signals representing the data in the preconfigured resources, when it is determined that the communications device can transmit signals in the preconfigured resources, wherein the procedure to determine whether the communications device can transmit signals in the preconfigured resources of the uplink includes a transmission parameter confirmation procedure which confirms that a value of one or more transmission parameters to be used for transmitting the signals representing the data can be used for the signals representing the data to be detected by an infrastructure equipment of the wireless communications network, wherein one or more criteria for the communications device to transmit data in the preconfigured resources of the wireless communications network includes an indication that the communications device should confirm a validity of the one or more transmission parameters from the infrastructure equipment of the wireless communications network before transmitting the signals representing the data in the preconfigured resources.

* * * * *